US007085771B2

(12) United States Patent
Chung et al.

(10) Patent No.: US 7,085,771 B2
(45) Date of Patent: Aug. 1, 2006

(54) SYSTEM AND METHOD FOR AUTOMATICALLY DISCOVERING A HIERARCHY OF CONCEPTS FROM A CORPUS OF DOCUMENTS

(75) Inventors: Christina Yip Chung, Sunnyvale, CA (US); Jinhui Liu, Sunnyvale, CA (US); Alpha Luk, San Jose, CA (US); Jianchang Mao, San Jose, CA (US); Sumit Taank, Austin, TX (US); Vamsi Vutukuru, Austin, TX (US)

(73) Assignee: Verity, Inc, Sunnyvale, CA (US)

( * ) Notice: Subject to any disclaimer, the term of this patent is extended or adjusted under 35 U.S.C. 154(b) by 204 days.

(21) Appl. No.: 10/150,795

(22) Filed: May 17, 2002

(65) Prior Publication Data
US 2003/0217335 A1  Nov. 20, 2003

(51) Int. Cl.
*L06F 17/30* (2006.01)
(52) U.S. Cl. .......................................... 707/102; 707/7
(58) Field of Classification Search ............... 707/1, 707/3, 5, 6, 7, 100, 101, 102, 103 R, 104.1, 707/200, 204; 345/440, 854; 382/159, 219, 382/225; 702/101; 704/245, 260; 706/16, 706/20; 705/10, 37; 712/1; 715/513, 514
See application file for complete search history.

(56) References Cited

U.S. PATENT DOCUMENTS

| | | | | |
|---|---|---|---|---|
| 6,100,901 A | * | 8/2000 | Mohda et al. | 345/440 |
| 6,446,061 B1 | * | 9/2002 | Doerre et al. | 707/3 |
| 6,598,043 B1 | * | 7/2003 | Baclawski | 707/3 |
| 2003/0135445 A1 | * | 7/2003 | Herz et al. | 705/37 |

* cited by examiner

*Primary Examiner*—Apu Mofiz
(74) *Attorney, Agent, or Firm*—William L. Botjer

(57) ABSTRACT

The invention is a method, system and computer program for automatically discovering concepts from a corpus of documents and automatically generating a labeled concept hierarchy. The method involves extraction of signatures from the corpus of documents. The similarity between signatures is computed using a statistical measure. The frequency distribution of signatures is refined to alleviate any inaccuracy in the similarity measure. The signatures are also disambiguated to address the polysemy problem. The similarity measure is recomputed based on the refined frequency distribution and disambiguated signatures. The recomputed similarity measure reflects actual similarity between signatures. The recomputed similarity measure is then used for clustering related signatures. The signatures are clustered to generate concepts and concepts are arranged in a concept hierarchy. The concept hierarchy automatically generates query for a particular concept and retrieves relevant documents associated with the concept.

39 Claims, 11 Drawing Sheets

SYSTEM AND METHOD FOR AUTOMATICALLY DISCOVERING A HIERARCHY OF CONCEPTS FROM A CORPUS OF DOCUMENTS

CROSS REFERENCE TO RELATED APPLICATIONS

This application is related to patent application Ser. No. 10/096,048 filed on Mar. 12, 2002, and Entitled "A Method And System For Naming A Cluster Of Words And Phrases", which is incorporated by reference herein in their entirety.

BACKGROUND OF THE INVENTION

1. Field of the Invention

The invention generally relates to automatically discovering a concept hierarchy from a corpus of documents. More particularly, the invention is a method, system and computer program for automatically discovering concepts from a corpus of documents and automatically generating a labeled concept hierarchy.

2. Related Art

Enormous amount of information is generated everyday; most of this information is in the form of soft documents. The information is fed into computer systems of various establishments, organizations and the World Wide Web for the purpose of storage and circulation. The volume of soft documents generated can be estimated from the fact that there are about 4 billion static web pages on the Internet, and that the web is growing at a rate of about 7.3 million new pages per day.

Searching for relevant information from huge volume of data is a difficult task, if the information is not organized in some logical manner. Complexity of the search increases as the size of the data space increases. This might result in situations, where searches may miss relevant information or return redundant results. Therefore, it is essential that the information be stored and arranged in a logical manner; clearly, such storage will lead to easy browsing and retrieval of the stored information (as and when required).

The problem of organizing this large volume of information/documents can be equated with the problem of arranging books in a library. In a library there are books dealing with diverse subjects. The books are organized in a logical manner, according to the subject they deal with, or according to the author, or according to some other characteristics (such as publisher or the date of publication etc.) The underlying objective is to create a system, wherein a user can easily locate the relevant book. This logical arrangement of books not only helps a user in locating the required book but also helps a librarian in arranging the books in the relevant sections.

In a similar manner, we now also have soft documents that deal with numerous topics. These soft documents need to be classified and arranged in a logical manner. A 'Document Taxonomy' logically arranges documents into categories. A category is a predefined parameter (or characteristic) for clustering documents pertaining to that specified parameter. For example, a taxonomy dealing with financial reports may categorize relevant documents into categories such as annual statements and periodic statements, which can be further categorized according to the different operational divisions. The documents to be populated in a predefined category can be identified based on the content and ideas reflected therein. A given category in taxonomy is populated with documents that reflect the same ideas and content. Taxonomy creation would facilitate mining of relevant information from a huge corpus of documents, by allowing for a manageable search space (category) to be created. This facilitates easier browsing, navigation and retrieval.

Taxonomy construction is a challenging task and requires an in-depth knowledge of the subject for which taxonomy is being generated. As such, taxonomy construction is usually done manually by experts in that particular domain. One example of manually created taxonomy structure is the directory structure of Yahoo. Manual taxonomy construction is usually time consuming and costly. Further, with the development of science and technology new fields are being identified and novel terms being coined. This makes updating of taxonomies a difficult task.

The organization of documents within categories in Taxonomy is facilitated, if the content and ideas of a document can be automatically identified without having to actually read through every document in a large corpus. The salient ideas reflected in the documents can be defined as 'Concepts'. For example, a document dealing with 'Renewable energy systems' may have concepts like windmill, solar energy, solar lighting, natural resources, biofuel and others. The concepts are arranged in a hierarchical structure, where related concepts are arranged close to each other and more general concepts are nearer to the top of the hierarchy. The concept hierarchy can be regarded as "a tree" (data structure), where the most general concept forms the root of the tree and the most specific ones are the leaves. The following is an example of a concept hierarchy; if science is taken as a root, it may have physics, chemistry, and biology as its "children" nodes. In turn, Physics, Chemistry and Biology may have their own children nodes; for example: Physics may have Mechanics, Electromagnetism, Optics, and Thermal Physics as its children nodes; Chemistry may have Organic chemistry and Inorganic chemistry as its children nodes, and Biology may have Botany and Zoology as its children nodes. Clearly, these nodes may further have children, and so on, until leaves (i.e., nodes having no children) are reached. Leaves signify the most specific classifications of science. Indeed, in one such hierarchy, neurology, pathology, nuclear magnetism, and alkenes may form the leaves of the hierarchy.

The concepts organized in a hierarchical structure facilitate a user to perform a search pertaining to these concepts. Further, searching for concepts also facilitates in populating categories in Document Taxonomy with documents associated with concepts. A category can contain more than one concept. Similarly, a concept can be used in more than one category. A conceptual search locates documents relevant to a concept based on keywords associated with the concept. A conceptual search may be used as a first step in identifying documents for a category in a taxonomy. Thus, automated concept and concept hierarchy generation considerably reduces the time and cost involved in manual taxonomy construction.

The process of automated concept extraction and concept hierarchy generation involves the following two steps: (a) Identification and extraction of concepts from the corpus of documents; and (b) Arrangement of concepts in a concept hierarchy.

a) Identifying and extracting concepts from the corpus of documents: Concepts represent the key ideas in the document. The key ideas of the document are often well represented by a set of keywords. These key words are extracted from the corpus of documents, and then related keywords are clustered together to represent a concept.

b) Concept hierarchy generation: The above-mentioned step of concept extraction usually results in a number of concepts being generated. Many of these concepts are related and many times a concept can be broken into further sub-concepts. A logical relationship among concepts is required to be identified. A concept hierarchy representing this logical relationship between concepts is generated.

Numerous methods have been developed for extracting concepts and generating concept hierarchies. Most of these methods use lexical information to extract concepts and to arrange them in hierarchical order.

"Automatic Concept Extraction From Plain Text", presented in AAAI Workshop on Learning for Text Categorization, Madison, July 1998 by Boris Gelfand, Mariltyn Wulfekuhler and William F. Punch III describes a system for extracting concepts from unstructured text. This system is dependent on lexical relationship among words and uses WordNet to find these relationships. WordNet is a lexical reference system of words. In WordNet words are arranged according to lexical concepts. For example nouns, verbs, adjectives and adverbs are organized into synonym sets, each representing one underlying lexical concept. Certain semantic features that are often called "base words" are extracted from raw text, which are then linked together by Semantic Relationship Graph (SRG). Base words constitute nodes in a SRG, and semantically related "base words" are linked to each other. For those "base words," which do not have a direct semantic relationship in the lexical database but are linked via a connecting word, this connecting word is added as an "augmenting word". For example, if the two words "biology" and "physics" appear in the SRG, and are not directly related, then it is likely that an "augmenting word" like "science" will be introduced into the SRG. Nodes that are not connected to enough nodes are removed from the graph. The resulting graph captures semantic information of the corpus and is used for classification. Finally, SRG is partitioned into sub-graphs in order to obtain classes of various documents.

"WEBSOM—Self Organizing Maps of Document Collections", presented in WSOM97 Workshop on Self-Organizing Maps, Espoo, Finland, 1997, by Timo Honkela, Samuel Kaski, Krista Lagus, and Teuvo Kohonen describes a method that uses a corpus of documents to extract a set of keywords that act as features for these documents. Suppose there are five documents to be classified and fifty keywords have been extracted out of these documents. These keywords are then used as features for these documents. For each of these documents, a "feature vector" of fifty dimensions is generated. Each element in the feature vector corresponds to the frequency of occurrence of the corresponding keyword in the document. These documents are mapped on a two dimensional map. Documents that are "close" to each other, according to the distance between their "feature vectors" are clustered together and are mapped close to each other on the map. This map provides a visual overview of the document collection wherein "similar" documents are clustered together.

"Finding Topic Words for Hierarchical Summarization", presented in International Conference on Research and Development in Information Retrieval, 2001, by D. Lawrie, W. Bruce Croft and A. Rosenberg describes a method for constructing topic hierarchies for the purpose of summarization. Topic hierarchy organizes topic terms into a hierarchy where the lower level topic terms cover the same vocabulary as its parents. This method uses conditional probabilities of occurrence of words in the corpus for extracting topic terms and for creating topic hierarchy. The relationship between any two words is expressed in a graph. This graph is a directed graph in which nodes are terms in the corpus, connected by edges that are weighted by "subsumption" probability. A term 'x' subsumes a term 'y' if 'y' is a more general description of 'x'. Nodes that have the highest subsumption probability and connect many other nodes are discovered as terms at a higher level of abstraction. This process is recursively repeated to discover terms at higher levels in the hierarchy.

"Deriving Concept Hierarchies From Text", presented in International Conference on Research and Development in Information Retrieval, 1999, by M. Sanderson and Bruce Croft describes a means for automatically deriving a hierarchical organization of concepts from a corpus of documents, based on subsumption probabilities of a pair of words. Words form the nodes in a concept hierarchy derived by this method. The word 'p' is the parent of the word 'c' if the word 'p' is a more general description of the word 'c'. The hierarchy generated captures the hierarchical relationship between words of the text.

In contrast, the present system organizes concepts into a hierarchy. The bottom layer of nodes in a hierarchy are words. Internal nodes of the hierarchy are concepts (clusters of words) organized into different levels of abstraction. The hierarchy captures relationship between concepts. Also, a node cannot belong to more than one parent in the hierarchy constructed by Sanderson and Croft. The present system does not suffer from this limitation.

In addition to the above mentioned research papers on the subject, various patents have been granted in the areas related to concept extraction and concept hierarchy construction.

U.S. Pat. No. 5,325,298 titled "Method for generating or revising concept vectors for a plurality of word stems" and U.S. Pat. No. 5,619,709 titled "System and methods of concept vector generation and retrieval" describe methods for generating context vectors which may be used in storage and retrieval of documents and other information. These context vectors are used to represent contextual relationships among documents. The relationship may be used to club related documents together.

U.S. Pat. No. 5,873,056 titled "Natural language processing system for semantic vector representation which accounts for lexical ambiguity" presents a method for automatic classification and retrieval of documents by their general subject content. It uses a lexical database to obtain subject codes, which are used for classification and retrieval. U.S. Pat. No. 5,953,726 titled "Method and apparatus for maintaining multiple inheritance concept hierarchies" deals with modification of concept properties and concept hierarchies.

The above methods and patents make an attempt to solve various problems associated with automated concept extraction and concept hierarchy generation. Still, there are various lacunas and the above mentioned research papers and patents fail to address one or more of the following concerns.

Most of the systems that depend on lexical databases for concept extraction are restricted in their scope by the extent of coverage of lexical databases. Usually, lexical databases are not specialized enough for dealing with topics related to specialized subjects. Moreover, advancement in science and technology leads to emergence of new fields and new terms being coined; for example, 'biometrics' is term that has been coined recently. Such fields and terms may not find reference in these databases.

Further, most of the systems, which use probabilistic models for concept extraction and concept generation, are deficient in the ability to handle the problem of 'data sparsity', 'polysemy' and occurrence of 'redundant keywords'.

The problem of data sparsity occurs due to the fact that 'key words' are chosen from a corpus of documents. The occurrence frequency of a keyword in a collection of documents (as opposed to a single document) is sparse. This may result in inaccurate weight being assigned to the key word and this would reflect on the measure of similarity between any two key words.

Polysemy refers to the problem where one word has more than one meaning. For example, the word 'club' can mean a suit in cards, or a weapon, or a gathering. Obtaining the contextual meaning of the word is important for the purpose of generating and arranging concepts in hierarchy. Prior work in word sense disambiguation differentiates meanings of a word using lexical references that store pre-defined definitions of words. Further, conventional word sense disambiguation focuses on lexical meanings of words and the contextual meanings of the word are generally neglected. For example, a sense of the word 'car' according to lexical knowledge refers to a transportation vehicle, but the word 'car' may have two contextual senses, one related to 'car insurance' and the other to 'car racing'.

The problem of 'redundant keywords' refers to the case, where redundant words occurring in the corpus may be chosen as key words. For example, the term 'reporter' can occur numerous times in a corpus of documents dealing with sports. This term may be chosen as a key word on the basis of occurrence frequency. However, this term has no bearing with the fields of sports and use of this term, as a key word for concept generation would result in inaccuracies.

In view of the above shortcomings, there exists a need for an automated approach for concept extraction and concept hierarchy generation that overcomes the above-mentioned drawbacks.

SUMMARY OF THE INVENTION

An object of the present invention is to provide a system, method and computer program for automatically discovering a concept hierarchy from a corpus of documents, wherein concept hierarchy organizes concepts into multiple levels of abstraction.

Another object of the present invention is to provide a system, method and computer program for automatically extracting concepts from a corpus of documents.

Another object of the present invention is to provide a system, method and computer program for automatically extracting signatures from a corpus of documents. Further, the invention provides for identifying similarity between signatures for clustering related signatures to generate concepts.

Yet another object of the present invention is to obtain a measure of similarity between signatures. The similarity measure may be used identify related signatures.

Still another object of the present invention is to refine the frequency distribution of signatures for alleviating any inaccuracy in the similarity measure resulting from the data sparsity and polysemy problems.

Still another object of the present invention is to automatically arrange concepts at multiple levels of abstraction in a concept hierarchy.

Yet another object of the present invention is to create a user-friendly interface for the concept hierarchy generated. The interface allows a user to efficiently retrieve relevant documents pertaining to a concept in the concept hierarchy.

Still another object of the present invention is to create a user interface to facilitate users in browsing and navigating information content of a corpus of documents.

Another object of the present invention is to combine knowledge base from lexical reference with corpus analysis to generate a concept hierarchy that better characterizes the information content of a corpus of documents.

Yet another object of the present invention is to facilitate the construction of taxonomy by automatically deriving the categories of the taxonomy and populating the categories with associated documents using the concept hierarchy.

The present invention is a method, system and computer program for automatically discovering concepts from a corpus of documents and automatically generating a labeled concept hierarchy. A concept is a cluster of related signatures. The method involves extraction of signatures (noun and noun phrases) from the corpus of documents for clustering related signatures to generate concepts. The similarity between signatures is computed using a statistical measure. The distribution of signatures in the corpus is refined to alleviate any inaccuracy in the similarity measure. The signatures are also disambiguated to address the polysemy problem. The similarity measure is recomputed based on the refined frequency distribution and disambiguated signatures. Thus the similarity measure is adjusted to obtain a true measure of similarity for identifying related signatures. The related signatures are clustered to generate concepts and concepts are clustered to form parent concepts to generate a concept hierarchy. The concept hierarchy generated may be used to automatically generate query for a particular concept that may retrieve relevant documents associated with the concept.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which.

DESCRIPTION OF PREFERRED EMBODIMENTS

Definition of Terms

Figure 1:
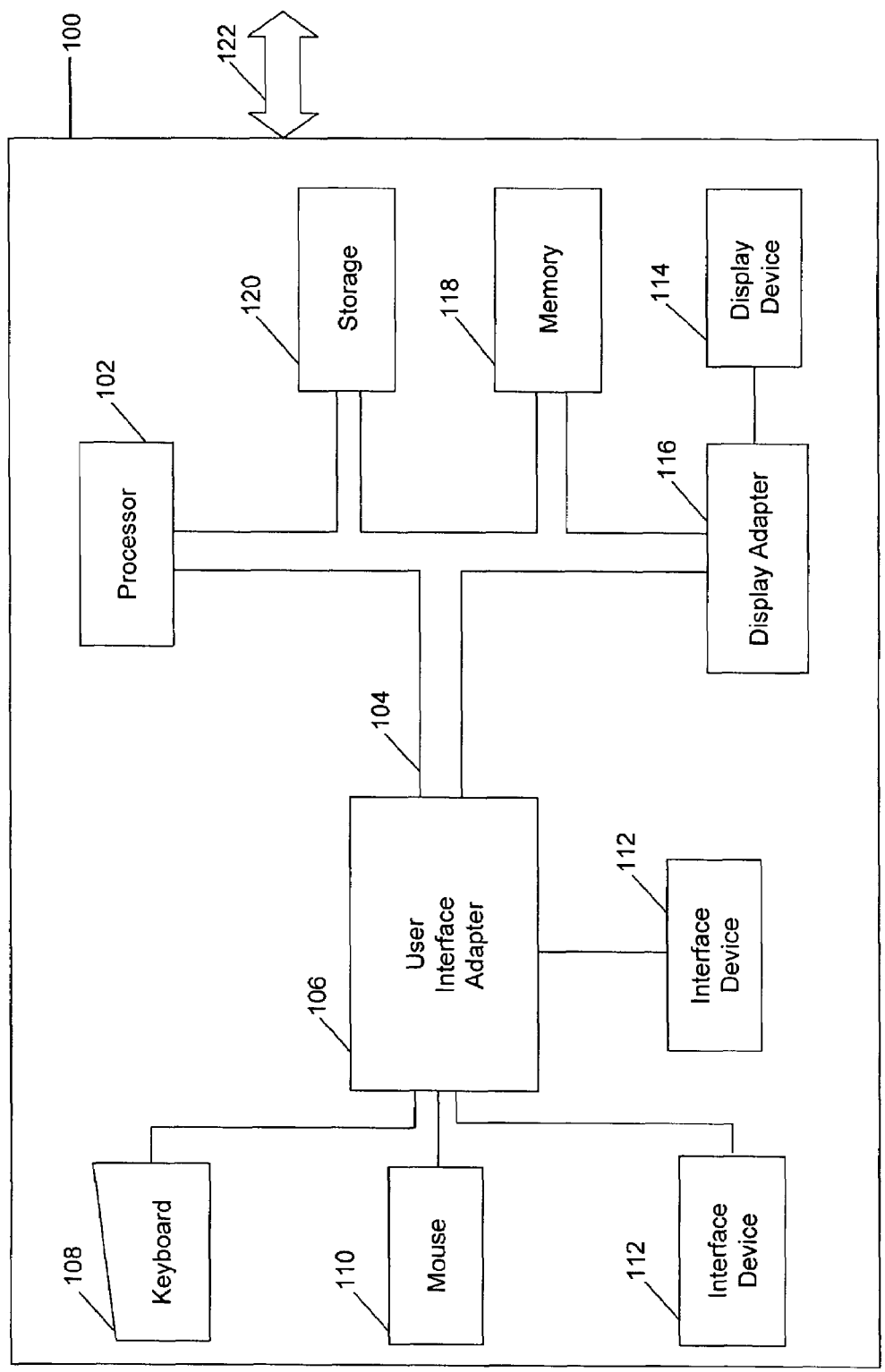
FIG. 1 is a block diagram of a computer workstation environment in which the present invention may be practiced.

Signature: The term 'Signature' refers to a 'noun' or 'noun-phrase' occurring in a document. The content of a document is usually carried by noun or noun-phrases occurring therein. These noun and noun-phrases thus reflect the content of the corresponding document. Drawing analogy from the signature of individuals; as a signature is regarded as indicative of the identity of an individual, likewise noun and noun phrases that reflect the identity and content of a document are referred to as 'signatures'. A signature may also be considered as a cluster with one member and may also be referred to as a leaf cluster.

Concept: The term 'Concept' refers to a cluster of related signatures.

Concept hierarchy: The term 'Concept hierarchy' refers to a hierarchical arrangement of concepts. In a concept hierarchy, related concepts are arranged close to each other and more general concepts are nearer to the top of the hierarchy.

Label: The term 'Label' refers to a name given to a concept. It is a descriptive word or phrase that may be used to identify the essence and constituents of the concept being represented.

Taxonomy: Taxonomy organizes categories into a tree and associates categories with relevant documents.

Category: A category is a predefined parameter (or characteristic) for clustering documents pertaining to that specified parameter.

Compactness: The term 'Compactness' can be defined as a measure of the average similarity between the constituent signatures of a cluster, or the average similarity between its child clusters.

Connectivity: The term 'Connectivity' may be defined as the average similarity measure between the constituents of two clusters. The constituents of a cluster may be signatures or child clusters.

Intra-cluster distance: Intra-cluster distance is captured by the compactness of a cluster. It is inversely related to the measure of compactness, i.e. a higher compactness of a cluster implies a lower intra-cluster distance.

Inter-cluster distance: Inter-cluster distance is captured by the connectivity between clusters. It is inversely related to the measure of connectivity, i.e. a higher connectivity between clusters implies a lower inter-cluster distance.

Polysemy: The term 'Polysemy' refers to the property of a word of having more than one meaning associated with it. This causes ambiguity when such a polysemous word is considered individually without any contextual relation.

Data sparsity: The term 'Data sparsity' refers to the property that a document contains a small subset of words from the vocabulary of the whole corpus. An idea may be conveyed by several words. The corpus may contain all the words related to the idea, but all the words may not essentially occur simultaneously in all the documents containing that idea. This results in a case where the same concept is represented by different words in different documents of the corpus.

Core Concepts

Content of a document can be summarized in form of key ideas carried by the document. These key ideas of the document can be represented by a few key words or key phrases. Generally, the documents reflect more than one idea, hence the keywords and key-phrases also relate to more than one idea. A cluster of keywords/key-phrases related to the same idea is known as a concept. The name assigned to such a cluster is referred to as a label.

The keywords or key phrases are referred to as signatures. As the signature of an individual is indicative of the identity of the individual, likewise these keywords and key-phrases represent the content or identity of a document.

The relationship between signatures, concepts and labels can be well understood from the following example. Signatures like malaria, osteoporosis, hospital, lung and medicine extracted from a document indicate that the document carries the idea of 'healthcare'. In this example 'healthcare' may be the label assigned to the cluster of above-mentioned signatures. Thus, the cluster of the above mentioned signatures is a concept that is represented by the label 'healthcare'.

Generally, the ideas or content of a document is carried by noun and noun phrases occurring in the document. Thus, the noun and noun phrases occurring in a document constitute the signatures of the document.

The ideas represented by concepts occur at multiple levels of abstraction i.e. an idea can be a very general idea like 'science' or a very specific idea like 'pathology'. Therefore, concepts representing these ideas also occur at multiple levels of abstraction.

These concepts are arranged at multiple levels of abstraction in a hierarchical structure to constitute a concept hierarchy. In a concept hierarchy more specific concepts follow from a more general concept. A concept hierarchy may be regarded as a tree representation of concepts, wherein as one goes from the root towards leaves, the concepts (represented by nodes) become more and more specific. For example, root of a tree may represent the concept 'Science'; this concept may have three children concepts namely, 'Physics', 'Chemistry', and 'Biology'. Each of these children concepts may in turn have their own children concepts; for example: Physics may have Mechanics, electromagnetism, Optics, and Thermal Physics as its children concepts; Chemistry may have Organic Chemistry and Inorganic Chemistry as its children concepts, and Biology may have Botany and Zoology as its children concepts. Further, each of these may have children, and so on, until leaves (i.e. nodes having no child) are reached. Leaves signify the most specific classification of science. In the above example neurology, pathology, nuclear magnetism and alkenes may form the leaves in the hierarchy. Since, a concept may also relate to more than more general concept, thus, a node in the concept hierarchy may also belong to more than one parent in the hierarchy.

The present invention provides a method, system and computer program for automatically identifying and extracting concepts from a corpus of documents and automatically generating a concept hierarchy. The concept hierarchy thus generated can be applied for the purpose of conceptual search and taxonomy construction amongst others.

Systems and Methodology

FIG. 1 illustrates a representative workstation hardware environment in which the present invention may be practiced. The environment of FIG. 1 comprises a representative single user computer workstation 100, such as a personal computer, including related peripheral devices. Workstation 100 includes a microprocessor 102 and a bus 104 employed to connect and enable communication between microprocessor 102 and the components of workstation 100 in accordance with known techniques. Workstation 100 typically includes a user interface adapter 106, which connects microprocessor 102 via bus 104 to one or more interface devices, such as a keyboard 108, mouse 110, and/or other interface devices 112, which may be any user interface device, such as a touch sensitive screen, digitized entry pad, etc. Bus 104 also connects a display device 114, such as an LCD screen or a monitor, to microprocessor 102 via a display adapter 116. Bus 104 also connects microprocessor 102 to memory 118 and long-term storage 120 which may include a hard drive, a diskette drive, a tape drive, etc.

Workstation 100 communicates via a communications channel 122 with other computers or networks of computers. Workstation 100 may be associated with such other computers in a local area network (LAN) or a wide area network, or workstation 100 can be a client in a client/server arrangement with another computer, etc. All of these configurations, as well as the appropriate communications hardware and software, are known in the art.

Figure 2:
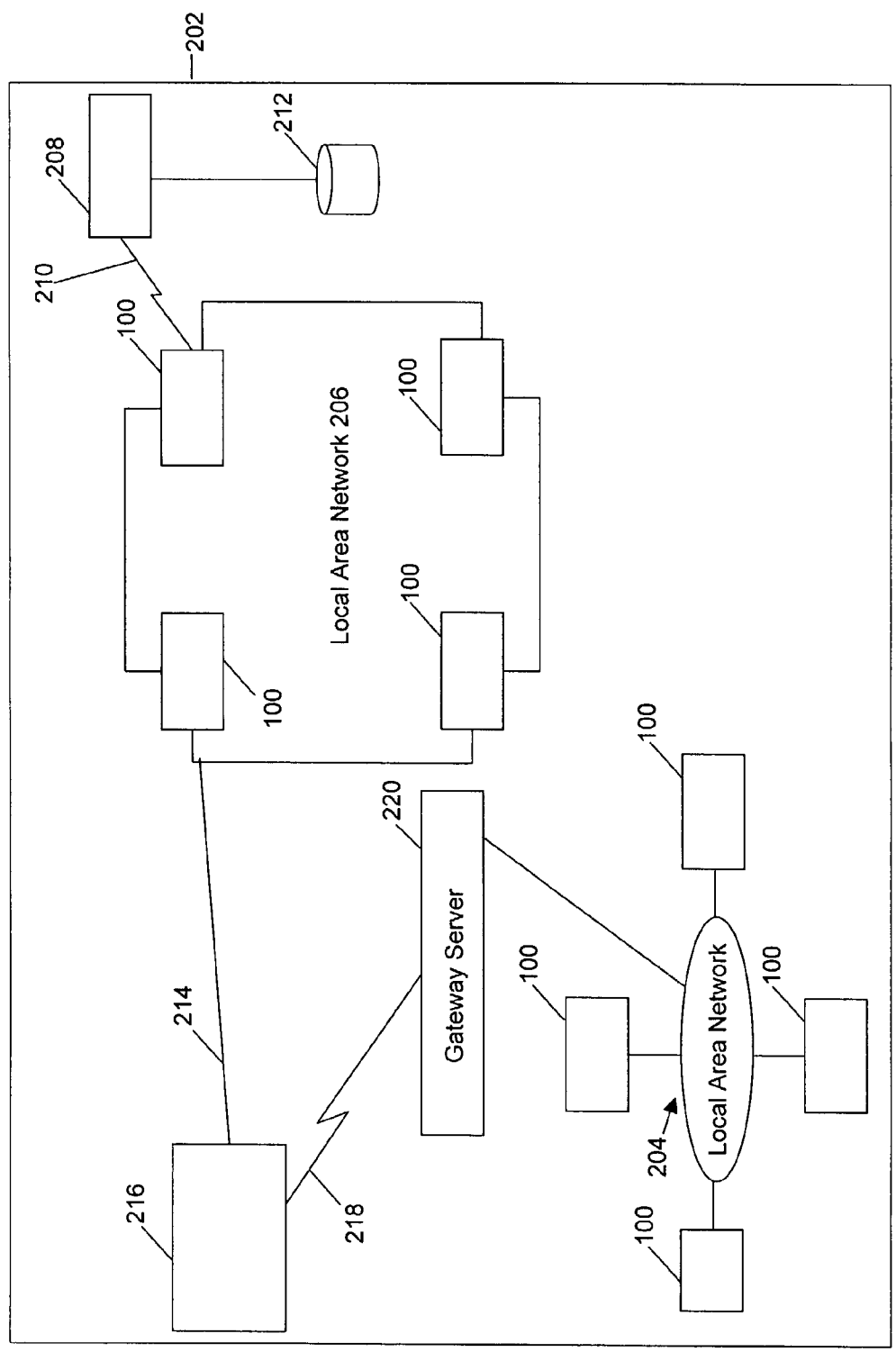
FIG. 2 is a block diagram of a networked computing environment in which the present invention may be practiced.

FIG. 2 illustrates a data processing network 202 in which the present invention may be practiced. Data processing network 202 includes a plurality of individual networks, including LANs 204 and 206, each of which includes a plurality of individual workstations 100. Alternatively, as those skilled in the art will appreciate, a LAN may comprise a plurality of intelligent workstations coupled to a host processor.

In FIG. 2, data processing network 202 may also include multiple mainframe computers, such as a mainframe computer 208, which may be preferably coupled to LAN 206 by means of a communications link 210.

Mainframe computer 208 may also be coupled to a storage device 212, which may serve as remote storage for LAN 206. Similarly, LAN 206 may be coupled to a communications link 214 through a subsystem control unit/communication controller 216 and a communications link 218 to a gateway server 220. Gateway server 220 is preferably an individual computer or intelligent workstation that serves to link LAN 204 to LAN 206.

Those skilled in the art will appreciate that mainframe computer 208 may be located at a large geographic distance from LAN 206, and similarly, LAN 206 may be located at a substantial distance from LAN 204.

Software programming code, which embodies the present invention, is typically accessed by microprocessor 102 of workstation 100 from long-term storage media 120 of some type, such as a CD-ROM drive or hard drive. In a client-server environment, such software programming code may be stored with storage associated with a server. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in memory 118, and accessed by microprocessor 102 using bus 104. The techniques and methods for embodying software programming code in memory, on physical media, and/or distributing software code via networks are well known and will not be further discussed herein.

The result obtained from the use of the present invention may be stored on any of the various media types used by long-term storage 120, or may be sent from workstation 100 to another computer or workstation of the network illustrated in FIG. 2 over communications channel 122, for storage by other computer or workstation.

In the preferred embodiments, the present invention is implemented as a computer software program. The software may execute on the user's computer or on a remote computer that may be connected to the user's computer through a LAN or a WAN that is part of a network owned or managed internally by the user's company. The connection may also be made through the Internet using an ISP. What is common to all applicable environments is that the user accesses a public network or private network, such as Internet or Intranet, through his computer, thereby accessing the computer software that embodies the invention.

Figure 3:
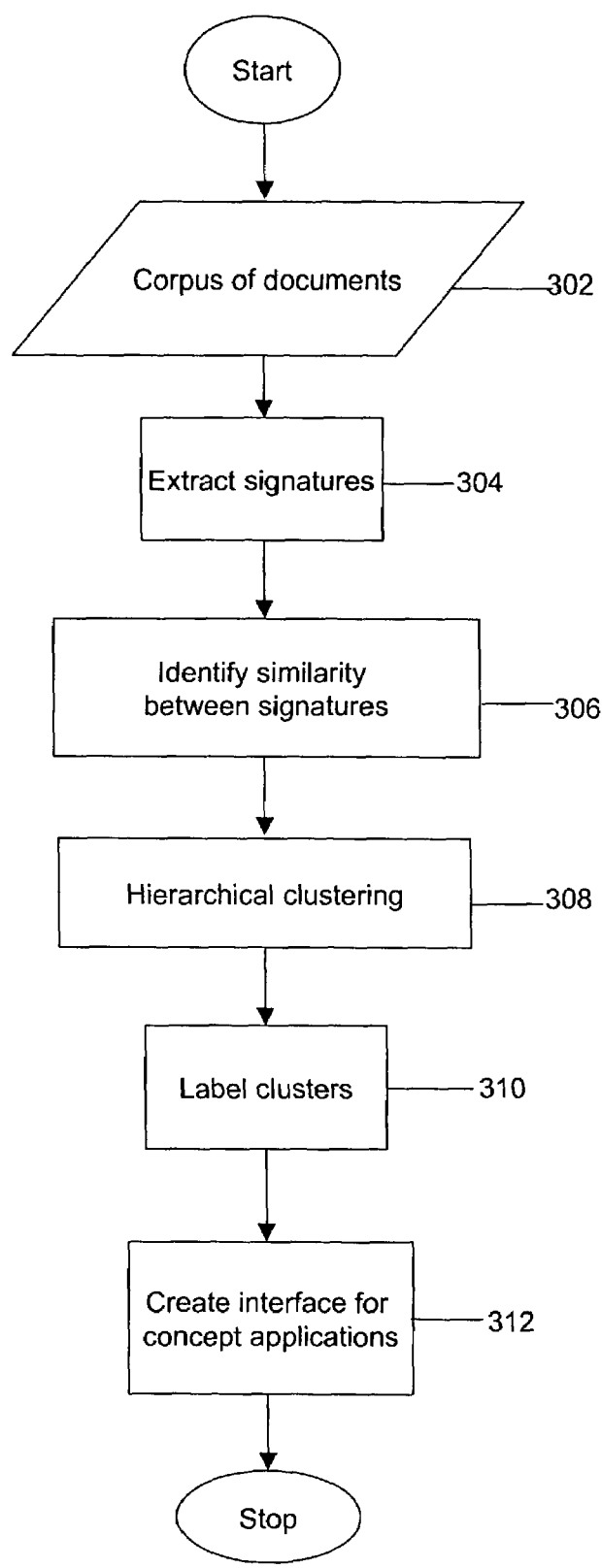
FIG. 3 is a flow chart that illustrates a method for automatically identifying concepts and generating a concept hierarchy in accordance with the present invention.

FIG. 3 is a flowchart of a method for automatically identifying concepts and generating a concept hierarchy. A corpus of documents is the input for the system in step 302. These documents may be reports, websites, newspaper articles and others and may reside in storage 120. Signatures are extracted from the corpus of documents in step 304. As mentioned earlier, signatures are noun and noun phrases occurring in the documents and represent the content of documents.

In step 306 similarity is identified between pairs of signatures extracted from the corpus of documents. In step 306 of identifying similarity between signatures, a quantitative measure of similarity between signatures is obtained. Relationship or similarity between the signatures is a measure of how closely the signatures represent the same concept. Higher the similarity measure between a pair of signatures, higher is the probability of their being related to the same idea.

Generally multiple concepts can be present in a document. The signatures extracted from the document will thus relate to more than one concept. For the purpose of identifying the distinct concepts, related signatures need to be identified. If a concept is reflected in more than one document, in all likelihood the related signatures will also co-occur in more than one document. Co-occurrence of signatures in a corpus of documents is therefore an indication of similarity between signatures and may be used for estimation of similarity. The similarity measure obtained on the basis of co-occurrence may suffer from inaccuracies due to the problems of data sparsity and polysemy.

Data sparsity problem refers to the problem that a document typically contains a small subset of words from the vocabulary of the whole corpus. A signature may occur repeatedly in few documents thereby increasing its frequency count in those documents. The same signature may occur rarely in few other documents, thereby having a low frequency count in other documents. Further, all the signatures may not be required to define the content of the document. Few of these terms may be sufficient to represent a concept. Also, some of the signatures may be redundant terms having no bearing on the content of documents. For example, a term like 'reporter' occurring in a set of documents dealing with sports has no bearing for the concept 'sport'.

Polysemy refers to a case where a signature can have more than one meaning. For example, the term 'club' can mean any of the following: a gathering, a suit in cards, a weapon etc. Therefore co-occurrence of 'club' with 'cards' and 'club' with 'weapon' does not imply that 'weapon' and 'cards' are related.

Figure 5:
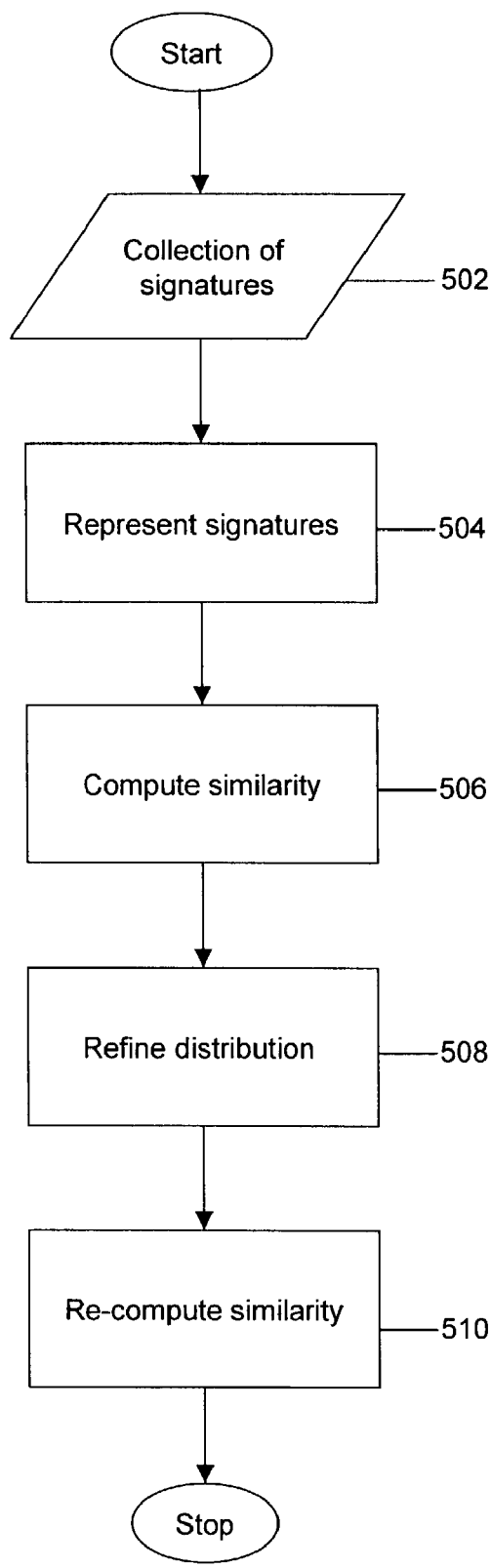
FIG. 5 is a flowchart that illustrates a method for identifying similarity between signatures in accordance with an embodiment of the present invention.

In the step of identifying similarity between signatures all the above-mentioned issues are taken care of. Various sub-steps involved in identifying similarity between signatures are illustrated in FIG. 5.

In step 308 of hierarchical clustering, related signatures are clustered to form concepts. Further, these concepts are organized in a hierarchical structure. Two embodiments of the step of hierarchical clustering are presented.

Step 310 of labelling concept is also described in commonly filed U.S. patent application Ser. No. 10/096,048 filed on Mar. 12, 2002, and incorporated herein by reference, entitled "A Method And System For Naming A Cluster Of Words And Phrases". As disclosed therein, the concepts are assigned meaningful labels. The labels assigned reflect the general to specific manner in which the concepts are organized in the concept hierarchy.

In step 312 an interface is created which displays the concept hierarchy generated. The interface facilitates browsing, conceptual searching and taxonomy construction from the concept hierarchy generated. Referring back to Step 302, the step of signature extraction further involves various sub steps, which are illustrated in FIG. 4.

Figure 4:
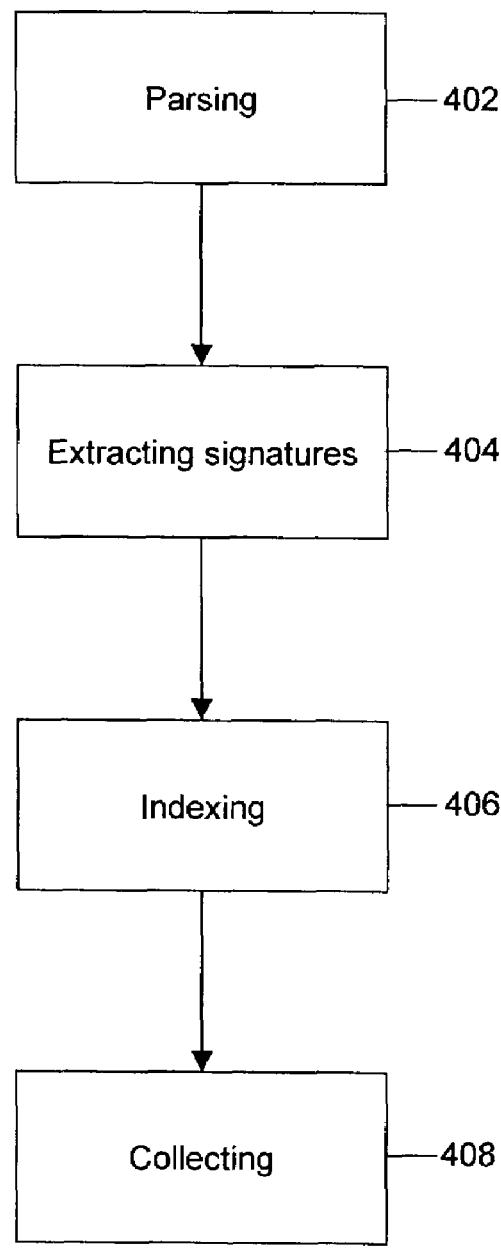
FIG. 4 illustrates a method for extracting signatures from a corpus of documents in accordance with an embodiment of the present invention.

FIG. 4 illustrates a method for extracting signatures from a corpus of documents. A corpus of documents is the input for the system. From a set of all the words occurring in a document, the step of signature extraction extracts the relevant signatures. This may require speech tagging and sentence structure analysis.

In step 402 each document of the corpus is parsed i.e. each of its constituent sentences are broken into their component parts of speech with an explanation of the form, function and syntactical relationship between each part. The step of parsing may involve speech tagging for the purpose of obtaining relationships between words. Speech tagging process annotates terms in the documents with their corresponding parts of speech in sentences (such as verb, noun, pronoun, adjective, adverb, preposition, conjunction, interjection). Parts of speech of words can also be derived from examples of annotated documents in form of rules or statistical information on n-grams. N-gram based representation is a way of representing documents and their constituent pieces. In such a representation each n-gram is a 'n' character sub-string of some larger string in a document. In addition to these punctuation and capitalization information may also be used. In step 404 signatures i.e. noun and noun phrases are extracted from the parsed document. In step 406 the signatures are indexed to form an index structure. Given a signature, a search engine may quickly retrieve all the documents containing this signature using the indexed structure. The resultant signatures are then collected in step 408 and may be stored in storage 120. The signature extraction from the corpus of documents may also be carried out by using existing packages like 'Inxight LinguistX Plafform®' from 'InXight'.

Referring back to step 306, the step of identifying similarity between signatures mentioned therein, involves various sub-steps. These sub-steps are shown in FIG. 5.

FIG. 5 is a flowchart that illustrates a method for identifying similarity between signatures. In step 502, a collection of signatures is the input for the system. In step 504 the distribution of signatures across the corpus of documents is represented. The signatures distribution may be represented in the form of probability distribution of signatures in the corpus.

The frequency distribution of a signature 's' in a corpus of 'n' document can be represented as:

$$f(s)=[f_1(s), f_2(s), f_3(s) \ldots f_n(s)]$$

where, $f_i(s)$ is the number of occurrences of the signature 's' in the $i^{th}$ document.

The frequency measure may thereafter be normalized to obtain the probability distribution of the signatures. The probability distribution of signature 's' in a corpus of 'n' documents can be represented as:

$$p(s)=[p_1(s), p_2(s), p_3(s) \ldots p_n(s)] \text{ Such that } \tau p_i(s)=1$$

where, $p_i(s)$ is the probability of occurrence of signature 's' in $i^{th}$ document.

The signatures thus represented give an idea of the distribution of signatures across the corpus of documents.

The similarity measure between pairs of signatures is computed in step 506. The similarity measure quantifies the similarity between the pairs of signatures. The signatures having high similarity measure have a higher probability of referring to the same concept.

In step 506 similarity between signatures is computed on the basis of standard statistical measures. Various statistical measures known in the art may be used to estimate the similarity. This similarity measure is computed on the basis of actual distribution of signatures across the corpus of documents.

An embodiment of the invention uses 'mutual information' (MI) as a statistical measure for computing similarity between signatures.

MI is calculated as:

$$MI(s, t) = \sum_i p_i(s, t)\log\frac{p_i(s, t)}{p_i(s)p_i(t)}$$

where, $p_i(s)$ and $p_i(,t)$ are the probabilities of occurrence of signatures 's' and 't' in $i^{th}$ document respectively and $p_i(s,t)$ is the probability of co-occurrence of signatures 's' and 't' in the $i^{th}$ document. The base of log is 2.

Another similarity measure (SIM), which is based on modified Kullback-Leibner (KL) distance, may also be used in another embodiment:

In this case similarity measure (SIM) is computed as:

$$SIM(s, t)=1.0-KL(s, t)$$

where, KL(s, t) is modified Kullback-Leibner distance.

The modified Kullback-Leibner distance is calculated as:

$$KL(s, t) = \min\left\{\sum_i p_i(s)\log\left(\frac{2p_i(s)}{p_i(s) + p_i(t)}\right), \sum_i p_i(t)\log\left(\frac{2p_i(t)}{p_i(s) + p_i(t)}\right)\right\}$$

It will be evident to one skilled in the art that other statistical measures may also be used to compute similarity between signatures.

The modified Kullback-Leibner distance may also be used to address the polysemy issue. As mentioned earlier, polysemy refers to a situation where a signature has multiple meanings or senses associated with it. Suppose 'p' is a signature that has multiple meanings. In this case let, 'p' have two senses—one is the sense relating to 'q', the other 'r'. Signature 'p' may co-occur with signatures 'q' and 'r', but not with both of them together. The modified KL(p,q) and KL(p,r) will give a small distance measure between pairs 'p' and 'q', 'p' and 'r'. Without polysemy adjustment, the pair wise distances between 'p' and 'q', 'p' and 'r' are large. After polysemy adjustment, the distances are reduced, reflecting their relationships.

Data sparsity may result in a skewed distribution of signatures across the corpus. The probability distribution of signatures obtained on the basis of actual occurrence may not indicate the true picture. Further, the similarity measure computed using statistical measures might not reflect the true similarity due to polysemy. Probability of occurrence of signatures in the corpus is used as a parameter in statistical measures to compute similarity. The resulting similarity measure cannot differentiate between different senses (different meanings) of a signature that may occur across the corpus of documents, resulting in inaccuracies.

The similarity measure calculated in step 506 on the basis of actual distribution thus does not reflect the true similarity between signatures. The distribution of signatures in the corpus is refined and the similarity measure recomputed to reflect the true similarity between signatures in step 508.

In step 508 the frequency distribution of signatures in the corpus of documents is refined. The refined distribution is thereafter used to recompute the similarity measure in step 510. The refined distribution alleviates the problem of inaccuracy in similarity measure.

In the preferred embodiment, co-occurrence frequency of pairs of signatures are refined for overcoming the problem of data sparsity. In the preferred embodiment, a smoothing technique based on co-occurrence frequency of pairs of signatures is used to refine the probability distribution of signatures across the corpus of documents. Compared to adjusting the frequency of occurrence of individual signatures, use of co-occurrence frequencies of pairs of signatures for adjustment and refining distribution of signatures reduces the memory overhead from O(sD) to O(s(s−1)). Where 's' and 'D' are the number of signatures and documents respectively.

In the preferred embodiment, the adjusted co-occurrence frequency of signatures 's' and 't' after $i^{th}$ iteration of smoothing is given by $f^{i+1}(s,t)$:

$$f^{i+1}(s, t) = f^i(s, t) + \lambda \sum_x f^i(s, x, t)$$

where, $\lambda$ is a predefined smoothing parameter and $f^i(s,x,t)$ is the joint occurrence frequency of signatures s, x and t in the $i^{th}$ document. $\lambda$ is chosen by trial-and-error. Empirical studies have shown that 1 to 10 is a viable range for the values of $\lambda$.

Liberal smoothing requires a larger value of $\lambda$ and more number of iterations to be performed. The effect of smoothing is very sensitive to the statistical measure of similarity between signatures. Therefore, it is desirable to bias towards the conservative.

In the preferred embodiment, the joint occurrence frequency $f_i(s,x,t)$ is estimated using conditional probability of a pair of signatures. It will be evident to one skilled in the art that other statistical measures can also be used to calculate the joint occurrence frequency $f_i(s,x,t)$.

There can be millions of documents in a corpus, but usually the information content of the corpus can be captured by a fixed and reasonably small number of signatures. For adjustment and refinement of distribution, only those signatures with high similarity measure with a signature are used to refine its distribution.

The component $$\lambda \sum_x f^i(s, x, t)$$

may be estimated using conditional probability, where:

$$f^{i+1}(s, t) = f^i(s, t) + \lambda \left( \sum_{Stat(x,t)\geq\sigma, x\neq s} p^i(s|x)p^i(x|t)p^i(t) + \sum_{Stat(y,st)\geq\sigma, y\neq t} p^i(t|y)p^i(y|s)p^i(s) \right)$$

where, Stat(s,t) is the chosen statistical measure, and $\sigma$ a predefined threshold of similarity measure, $p^i(x|y)$ is the conditional probability of having x in a document given that y is in the document at the $i^{th}$ iteration. Conditional probabilities may be computed using Baye's Rule.

Baye's rule:

$$p^i(x|y) = \frac{p^i(x, y)}{p^i(y)}$$

In the preferred embodiment, probabilities are estimated using co-occurrence information:

$$p^i(x, y) = \frac{f^i(x, y)}{F_2^i}$$

$$p^i(x) = \frac{\sum_y f^i(x, y)}{F_2^i}$$

where $$F_2^i = \sum_y \sum_x f^i(x, y)$$

The refinement of distribution as above, takes care of the situation where signatures are related but do not co-occur frequently. This refinement allows for a more accurate similarity measure, where, a higher similarity measure is assigned to reflect the relationship of such signatures which are related but which do not co-occur frequently.

In the preferred embodiment problem of polysemy is solved by disambiguating the signatures. Frequently occurring signatures are more likely to be ambiguous. This will result in a low estimate of similarity measure between other less frequently occurring signatures. Thus, most frequent signatures are chosen for the purpose of disambiguation. The senses of these ambiguous signatures may be automatically discovered using an association rules algorithm. The frequency distribution of ambiguous signatures is then decomposed into different senses. This would result in general signatures having high similarity measure with ambiguous signatures of correct senses.

Figure 6:
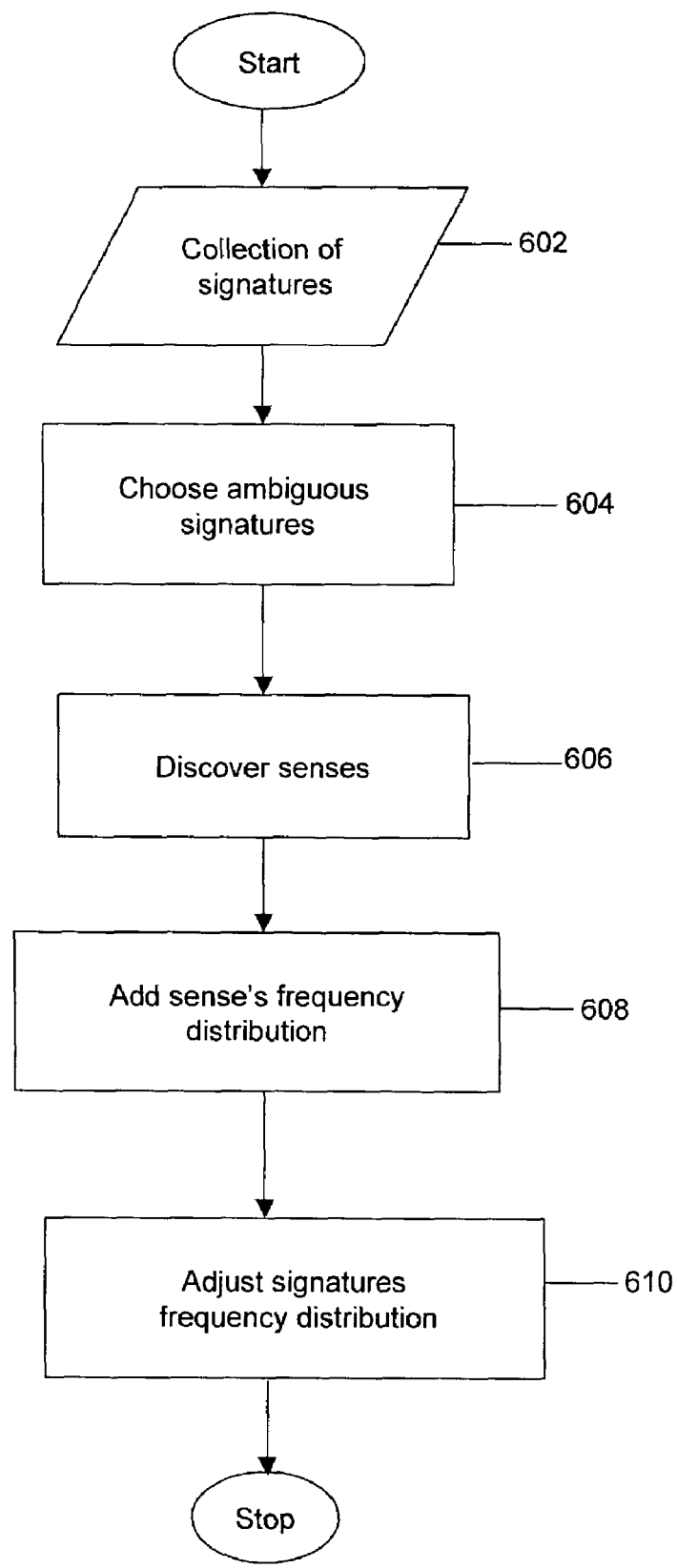
FIG. 6 is a flowchart that illustrates a method of polysemy adjustment in accordance with an embodiment of the present invention.

The various steps involved in the process of polysemy adjustment are shown in FIG. 6. FIG. 6 is a flowchart that illustrates a method for polysemy adjustment.

A collection of signatures is the input for the system at step 602. In step 604 ambiguous signatures are chosen for polysemy adjustment. Ambiguous signatures are those signatures, which have more than one meaning associated with them. Studies have shown that there is a positive correlation between the degree of ambiguity of a signature and its occurrence frequency. Also, the frequency distribution of signatures follows Ziff's law. Thus, top x % (10%–20%) frequent signatures may be chosen for disambiguation.

The step of identifying ambiguous signatures is followed by step 606 of discovering the various senses for these ambiguous signatures. The senses may be discovered using an association rules algorithm. The association rule algorithm presented in the proceedings of the 20$^{th}$ International Conference of Very Large Databases (VLBD) by R. Agrawal and R. Srikant may be used for this purpose.

The frequency distributions of relevant signatures are decomposed into multiple distributions. A sense 'S' is of a set of signatures $s_1 \ldots s_k$ that often co-occur together:

$$S = \{s_1, \ldots, s_k | Sup(s_1, \ldots, s_k) \geq \delta\}$$

where, $Sup(s_1, \ldots, s_k)$ is the number of documents in the corpus in which $s_1 \ldots s_k$ jointly co-occur and s is a predefined threshold.

In the preferred embodiment, association rules algorithm having two constraints is used to discover senses. The constraints being: while discovering senses care is taken such that senses are smaller than a predefined size to balance efficiency and accuracy. Empirical studies have shown that 4 to 7 is a good range. Also, it is ensured that each sense contains an ambiguous signature 's' chosen in step 604. Other signatures in the sense must have frequencies lower than that of 's' so that 's' is not disambiguated by a potentially more ambiguous signature.

Association rule algorithm that may be used in the preferred embodiment is:

```
S = {{f: f is a frequent signature}}
for (size = 1; size <= MaxSenseSize; size++
{
    for each sense s = {f1...fn} in S
        extended = false
        for each signature t with frequency lower than f1 ...fn
            s' = {f1 ...fn t}
            if Support(s') >= threshold
                S = S + {s'}
                extended = true
        if (extended == true)
            S = S - {s}
}
```

In step 608 a frequency distribution is added for each sense. This frequency distribution is the common distribution of all the constituent signatures of the sense. The occurrence frequency of the sense 'S' in j$^{th}$ document is $\tilde{f}_j(S)$:

$$\tilde{f}_j(S) = \begin{bmatrix} \max\{f_j(s_1), \ldots, f_j(s_k)\} & \text{if } f_j(s_1) > 0 \wedge \ldots \wedge f_j(s_k) > 0 \\ 0 & \text{otherwise} \end{bmatrix}$$

In step 610 the frequency distribution of signatures is adjusted to account for polysemy. On the basis of frequency distribution of senses the distribution for signature $s_i$ in the sense 'S' in j$^{th}$ document is adjusted to $\tilde{f}_j(s_j)$ from its original frequency $f_j(s_j)$:

$$\tilde{f}_j(s_i) = \begin{bmatrix} 0 & f_j(S) > 0 \\ f_j(s_i) & f_j(S) = 0 \end{bmatrix}$$

Referring back to step 510 of FIG. 5, the similarity measure for all signatures and senses are re-computed after refining the distribution as above.

Referring again to FIG. 3, step 306 of identifying similarity is followed by the step of hierarchical clustering. In step 308 of hierarchical clustering, the similarity measure calculated in step 306 is used to generate concepts and to organize these concepts into a concept hierarchy.

In a concept hierarchy it is preferred that the concepts have high compactness and low connectivity. Compactness is a measure of similarity between signatures of a cluster and connectivity is a measure of similarity between the signatures of two different clusters. In a concept hierarchy of high quality, the further away two clusters are, the more dissimilar they are (i.e. high inter-cluster distance and low connectivity). Further, the members of a cluster (constituent signatures or children concepts) are similar having a high measure of compactness.

Compactness as mentioned above reflects how closely the constituents of a cluster (concept is a cluster of signatures) are related. The compactness is a measure of intra cluster distance of a cluster. Where intra-cluster distance is a measure of the average similarity between constituent signatures of a cluster. It is inversely related to the measure of compactness. That is, if a cluster consists of strongly related signatures then it will have low intra cluster distance and thereby high compactness.

The intra-cluster distance of a cluster 'C' is captured by its 'compactness'. A cluster consisting of similar members (low inter-cluster distance) has a high compactness measure. The compactness can be defined as the average similarity between its constituent signatures or child clusters. The measure of compactness for a cluster having signatures as its constituents can be computed as follows:

$$\text{Compactness}(C) = \frac{\sum_{t \in C, t \approx s} \sum_{s \in C} Sim(s, t)}{\frac{|C|(|C|-1)}{2}}$$

The measure of compactness for a cluster having child clusters as its constituents can be computed as follows:

$$\text{Compactness}(C) = \frac{\sum_{C_j \in Child(C)} \sum_{C_i \in Child(C)} \text{Connectivity}(C_i, C_j)}{|Child(C)|^2}$$

where, Child(C) are child clusters of the cluster 'C' and Connectivity $(C_i, C_j)$ is the connectivity between concepts $C_i$ and $C_j$.

Connectivity between two concepts is defined as average similarity measure between any two signatures from the two concepts (clusters). High connectivity between two concepts implies low inter-cluster distance, where inter-cluster distance is the average measure of similarity between two individual clusters. It is inversely related to the measure of connectivity i.e. a high measure of connectivity implies a low inter-cluster distance. Two concepts, which have high similarity, will have highly related signatures as their constituents.

The connectivity between two clusters 'S' and 'T' measures their inter-cluster distance. It is defined as the average similarity measure between any two signatures from the clusters and may be computed as follows:

$$\text{Connectivity}(S, T) = \frac{\sum_{t \in T} \sum_{s \in S} Sim(s, t)}{|S||T|}$$

where, |S||T| is the number of signatures in the clusters 'S' and 'T' respectively.

These measures of compactness and connectivity form the basis for clustering of concepts. The invention presents two embodiments for clustering concepts in a concept hierarchy.

In one embodiment for clustering, a greedy agglomerative approach is adopted to arrange concepts into a hierarchy. This is described in the procedure AgglomerativeClustering. In this embodiment the input for the system is a collection of signatures, which are then clustered to form concepts and the concepts thus generated are then arranged in a hierarchical structure.

A greedy algorithm selects a cluster pair with the lowest distance for merging. This embodiment proposes two sets of rules to merge the clusters in a way so as to maximize their inter-cluster distance as compared to the intra-cluster distance of the corresponding child clusters chosen for merging.

Procedure Agglomerative Clustering:

```
Procedure AgglomerativeClustering (I = {C1 ... Cn})
while |I| > 1
{
    Pick A, B ∈ I s.t. Connectivity(A,B) ≦ Connectivity(C_i, C_j) ∀C_i, C_j∈I
    I = I - {A} - {B}
    C = MergeClusters(A,B)
    I = I ∪ {C}
}
```

The input for the system is a set of signatures $C_1 \ldots C_n$ which are clusters of size one. At each iteration, clusters with the highest connectivity are selected for merging into a new cluster. Procedure MergeClusters considers four cases in merging clusters. These four cases are illustrated in FIG. 7.

Figure 7:
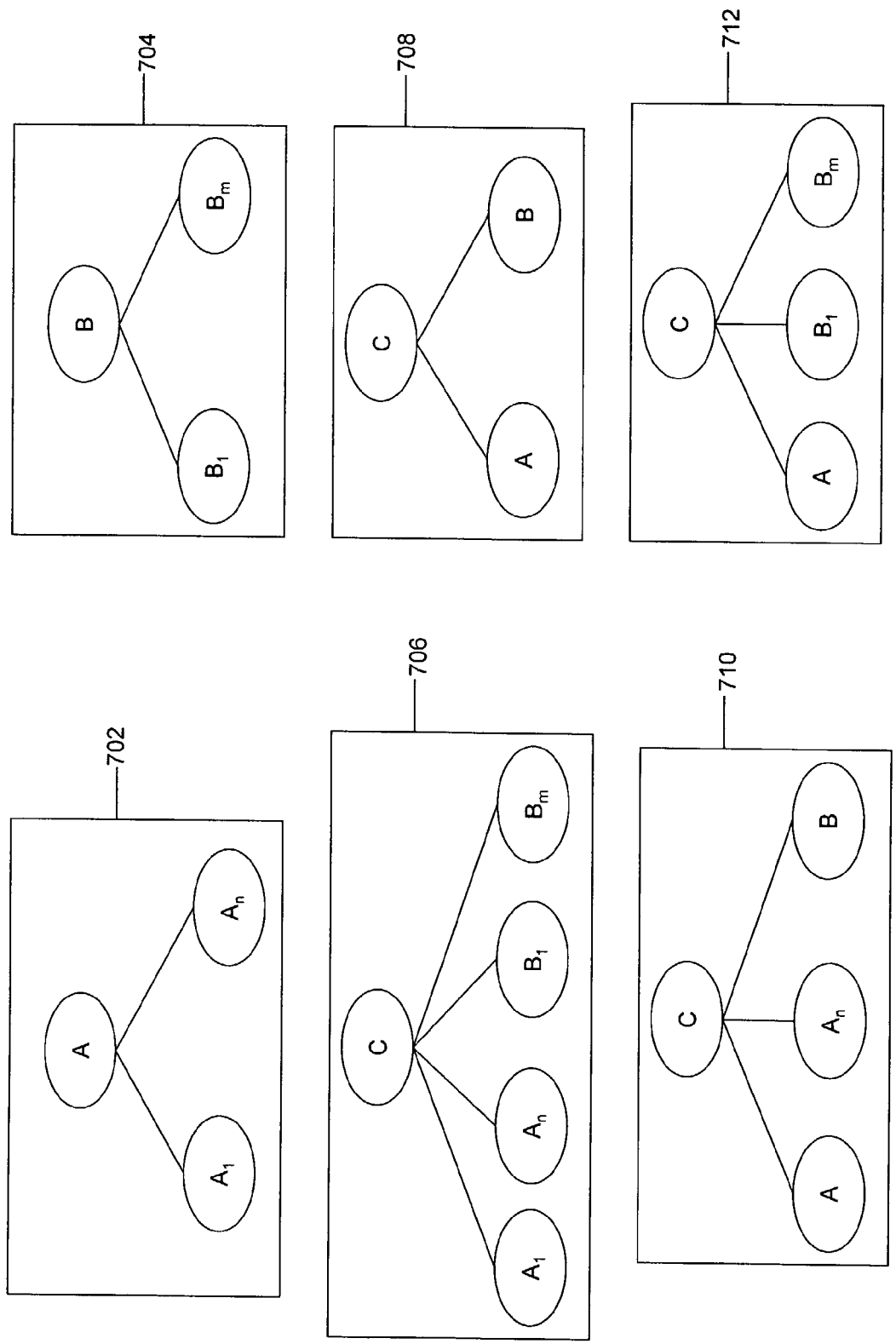
FIG. 7 shows the clustering of concepts to generate concept hierarchy in accordance with an embodiment of the present invention.

In FIG. 7, cluster 702 is a cluster having a label 'A'. Cluster 702 has child clusters $A_1$ to $A_n$. Similarly cluster 704 is a cluster having label 'B', cluster 704 has children clusters $B_1$ to $B_m$. Child clusters of 'A' and 'B' may be concepts or signatures. Procedure merge cluster results in four cases of merging clusters 'A' and 'B'. These four cases of merging are referred to as MergeTogether, MergeSibling, MergeLeft and MergeRight. The clusters obtained from merging of clusters A and B according to different cases are: cluster 706, cluster 708, cluster 710 and cluster 712.

These four cases can be understood by the following example: Suppose clusters A and B are chosen for merging. Based on the value of compactness and connectivity the clusters can be merged in following four ways. These four cases are chosen on the basis of heuristics. The embodiment also presents two sets of rules for clustering the concept in these four ways.

The first set of rules applies to a case where child clusters of cluster C have high intra-cluster distances and low inter-cluster distance. The first set of rules states:

$$\text{If } \frac{\text{Connectivity}(A, B)}{\text{Compactness}(A)} > \theta \wedge \frac{\text{Connectivity}(A, B)}{\text{Compactness}(B)} > \theta$$

In such a case MergeTogether is chosen and the clusters 702 and 704 are merged together and results in cluster 706.

$$\text{If } \frac{\text{Connectivity}(A, B)}{\text{Compactness}(A)} > \theta \wedge \frac{\text{Connectivity}(A, B)}{\text{Compactness}(B)} \leq \theta$$

In this case MergeLeft is chosen and results in cluster 710.

$$\text{If } \frac{\text{Connectivity}(A, B)}{\text{Compactness}(A)} \leq \theta \wedge \frac{\text{Connectivity}(A, B)}{\text{Compactness}(B)} > \theta$$

In this case MergeRight is chosen and cluster 712 is obtained.

$$\text{If } \frac{\text{Connectivity}(A, B)}{\text{Compactness}(A)} \leq \theta \wedge \frac{\text{Connectivity}(A, B)}{\text{Compactness}(B)} \leq \theta$$

In this case MergeSibling is chosen and cluster 708 is obtained.

In the above set of rules, $\theta$ is a predefined threshold. The value of $\theta$ may be defined on the basis of requirements i.e. the degree of compactness and connectivity required in the concept hierarchy generated.

The second set of rules deals with the case where child clusters of the cluster C have low intra-cluster distances and high inter-cluster distances, i.e., the case with the smallest R(C):

$$R(C) = \frac{\text{InterCluster}(C)}{\text{IntraCluster}(C)} \text{ where}$$

$$\text{InterCluster}(C) = \frac{\sum_{C_j \in \text{Child}(C), j \neq i} \sum_{C_j \in \text{Child}(C)} \text{Connectivity}(C_i, C_j)}{\frac{|\text{Child}(C)||\text{Child}(C) - 1|}{2}}$$

$$\text{IntraCluster}(C) = \frac{\sum_{C_i \in \text{Child}(C)} \text{Compactness}(C_i)}{|\text{Child}(C)|}$$

where, InterCluster(C) gives the average similarity measure between pairs of child clusters of C. IntraCluster(C) gives the average similarity measure of child clusters of C. The rule favors a configuration with a low R(C), which is one with low inter-cluster affinity and high intra-cluster affinity.

In the other embodiment, an undirected graph approach is used to generate concept hierarchy. This embodiment uses a graphical partitioning algorithm for grouping clusters represented by subgraphs that are obtained by appropriate partitioning of the original graph. The nodes of the graph represent signatures. An edge between two nodes is associated with a weight equal to the similarity measure between the nodes.

In this embodiment all the signatures are assumed to be part of a single cluster at the beginning. Then recursively they are broken down to achieve clusters (concept). These concepts are then arranged in a concept hierarchy.

A graph partitioning algorithm is used to partition signatures into a large number of partitions such that the weight of the edge-cut, i.e., the sum of weights of edges across partitions, is minimized. Since each edge in the graph represents the similarity between signatures, a partitioning is chosen such that it minimizes the edge-cut effectively thereby minimizing the affinity among signatures across partitions. This results in signatures in a partition being highly related to other signatures in the same partition.

The step may be performed by a binary graph-partitioning algorithm. An example of such graph-partitioning algorithm is METIS, which is an implementation of graph partitioning algorithms by University of Minnesota. A cluster 'C' is split into two sub-clusters 'A' and 'B' such that the edge-cut between 'A' and 'B' is minimized, and 'A' and 'B' contain at least x % of the signatures in 'C'. Empirical studies suggest that 20–40% is appropriate. A reader skilled in the art would realize that this limit might be varied.

This process starts with all signatures grouped into one cluster. Each recursive iteration, partitions a cluster into smaller sub-clusters. The process terminates when a desired number of partitions are formed or when partitions are too small for further partitioning.

After the partitions are formed, the compactness measure is used to group the partitions into a hierarchy. The partitions obtained from the graph-partitioning algorithm are taken as the initial set of clusters 'I'. Clusters in 'I' that result in merged clusters with high compactness are merged together. This results in a new set of merged clusters 'M'. The merging process is repeated with 'M' replacing 'I'. Each iteration generates a level of concepts in the hierarchy. The process stops when the number of merged clusters reaches a predefined value 'k'.

The system can efficiently select a group of clusters to merge at each iteration if the partitions obtained are ordered, i.e. similar partitions are adjacent to each other. Procedure FastMergePartitions may be used for this purpose. The procedure does not require comparing of all pairs of clusters to find the best clusters for merging. Only those clusters that are adjacent to each other may be used for comparison. By way of an example, consider a linear ordering of clusters 'A', 'B', and 'C'. The gap between clusters 'B' and 'C' is the difference in compactness measure of the clusters merged from 'A', 'B' and from 'B', 'C'. Clusters between large gaps may be selected for merging. This makes the merging process linear in time at each iteration.

The system can also efficiently compute the compactness measure of a merged cluster. The compactness measure for each cluster as well as the connectivity between concepts may be stored in storage 120 and used later.

The compactness of the merged cluster 'C' from clusters 'A' and 'B' may be computed as:

$$\text{Compactness}(C) = \frac{\frac{|A|(|A|-1)}{2}\text{Compactness}(A) + \frac{|B|(|B|-1)}{2}\text{Compactness}(B) + |A||B|\text{Connectivity}(A, B)}{\frac{(|A|+|B|)(|A|+|B|-1)}{2}}$$

FastmergePartions procedure is:

```
Procedure FastMergePartitions(I = {C₁ ... Cₙ},k)
do while ( |I| > k )
{
    lastMerge = −1
    lastCompact = −1
    M = Φ
    do while (lastMerge + 1 < |I|)
    {
        endMerge = lastMerge;
            for (i = lastMerge + 1; i < |I|; i++)
            {
            mergedCompact =
            ComputeMergedClusterCompactness(Cⱼ, C_{i+1})
            gap = | mergedCompact − lastCompact |
            if (lastCompact < 0 || gap > σ)
            {
                endMerge = i
                break
            }
        }
        C = FormCluster(C_{lastMerge}, ..., C_{endMerge})
        M = M ∪ C
        lastMerge = i
        lastCompact = mergeCompact
    }
        I = M
}
```

The step of merge cluster results in a hierarchical structure of concepts. This hierarchical structure of concepts can then be represented in a Graphical User Interface (GUI) as depicted in FIG. 8.

The GUI provides a user-friendly interface that allows a user to efficiently browse and navigate the concept hierarchy. The system also allows for editing the concept hierarchy generated.

Figure 8:
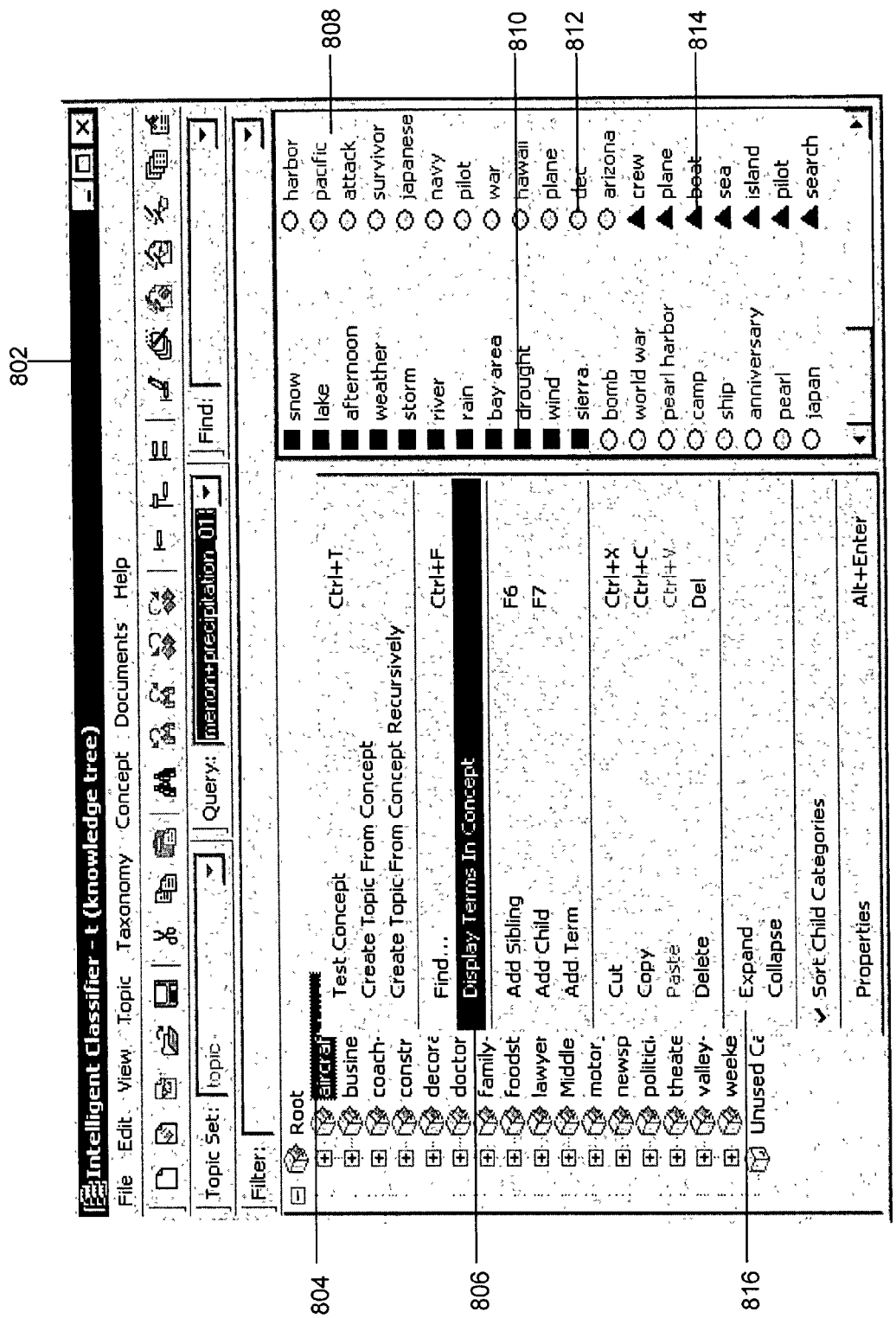
FIG. 8 is a screen shot of a Graphical User Interface for displaying a concept hierarchy generated automatically in accordance with an embodiment of the present invention.

FIG. 8 is a screenshot of a Graphical User Interface for displaying a concept hierarchy generated automatically, according to the present invention.

The GUI allows a user to browse and navigate the concept hierarchy displayed in an Intelligent Classifier 802. The Intelligent Classifier is a user-friendly GUI that facilitates applications of the concept hierarchy for efficient concept search and taxonomy construction among other applications. The concept hierarchy thus displayed through Intelligent Classifier GUI 802 allows a user to search for requisite information as described subsequently in FIG. 10 and create a taxonomy as described in FIG. 11.

A parent concept can be expanded to display children concepts. The signatures that are constituent in all the children concepts and thus in the parent concept can also be viewed. In FIG. 8, a parent concept 'aircraft+war' 804 is expanded to 'Display the terms (signatures) in concept' 806. The corresponding signatures are displayed in window 808. The signatures displayed with a square bullet 810 represent one of the child concepts constituted in the parent concept 'aircraft+war'. Similarly, the signatures displayed with a circular bullet 812 and a triangular bullet 814 represent other two children concepts constituted in parent concept 'aircraft+war' 804.

The children concepts clustered in parent concept 'aircraft+war' 802 can be viewed by clicking on Expand 816 or alternatively by clicking on node 'aircraft+war' 804. Similarly, the signatures corresponding to a particular child concept can be viewed by clicking on that particular child concept.

Thus, Intelligent Classifier 802 GUI enables a user to visualize signatures constituted in a given concept as well as view all signatures constituted in children concepts of a given parent concept. The parent concept can be expanded to display corresponding children concepts and children concepts can be expanded to display signatures.

The GUI allows a user to search for requisite concepts as well as signatures. Further, the GUI allows for manual editing of the concept hierarchy. A user can re-label or rename a concept as well as add or delete concepts in the hierarchy. A user can also add or delete signatures that cluster to constitute a concept.

Figure 9:
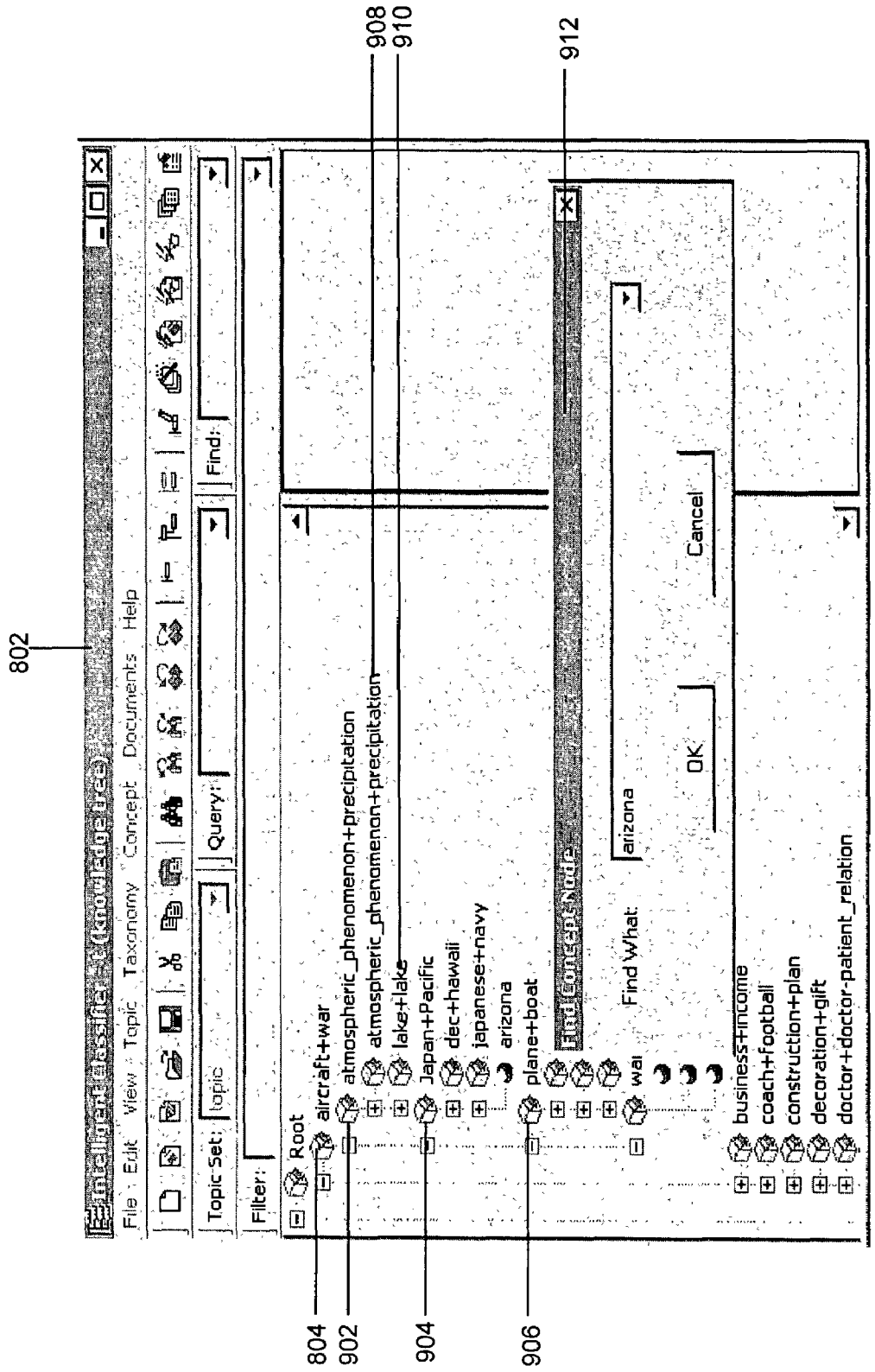
FIG. 9 is a screen shot of a Graphical User Interface that allows a user to search for a concept in the concept hierarchy in accordance with an embodiment of the present invention.

FIG. 9 is a screen shot of a GUI that allows a user to search for a concept in the concept hierarchy in accordance with the present invention. In FIG. 9, Intelligent Classifier 802 displays the children concepts clustered in parent concept 'aircraft+war' 804. The corresponding children concepts are 'atmospheric_phenomenon+precipitation' 902, 'Japan+Pacific' 904 and 'plane+boat' 906. Child concept 902 further has its child concepts 'atmospheric_phenomenon+precipitation' 908 and 'lake+lake' 910. Similarly, 'Japan+pacific' 904 and 'Plane+boat' 906 further have their respective chidren concepts which can be viewed in Intelligent Classifier 802. A user can search for a given concept in search window 912.

Figure 10:
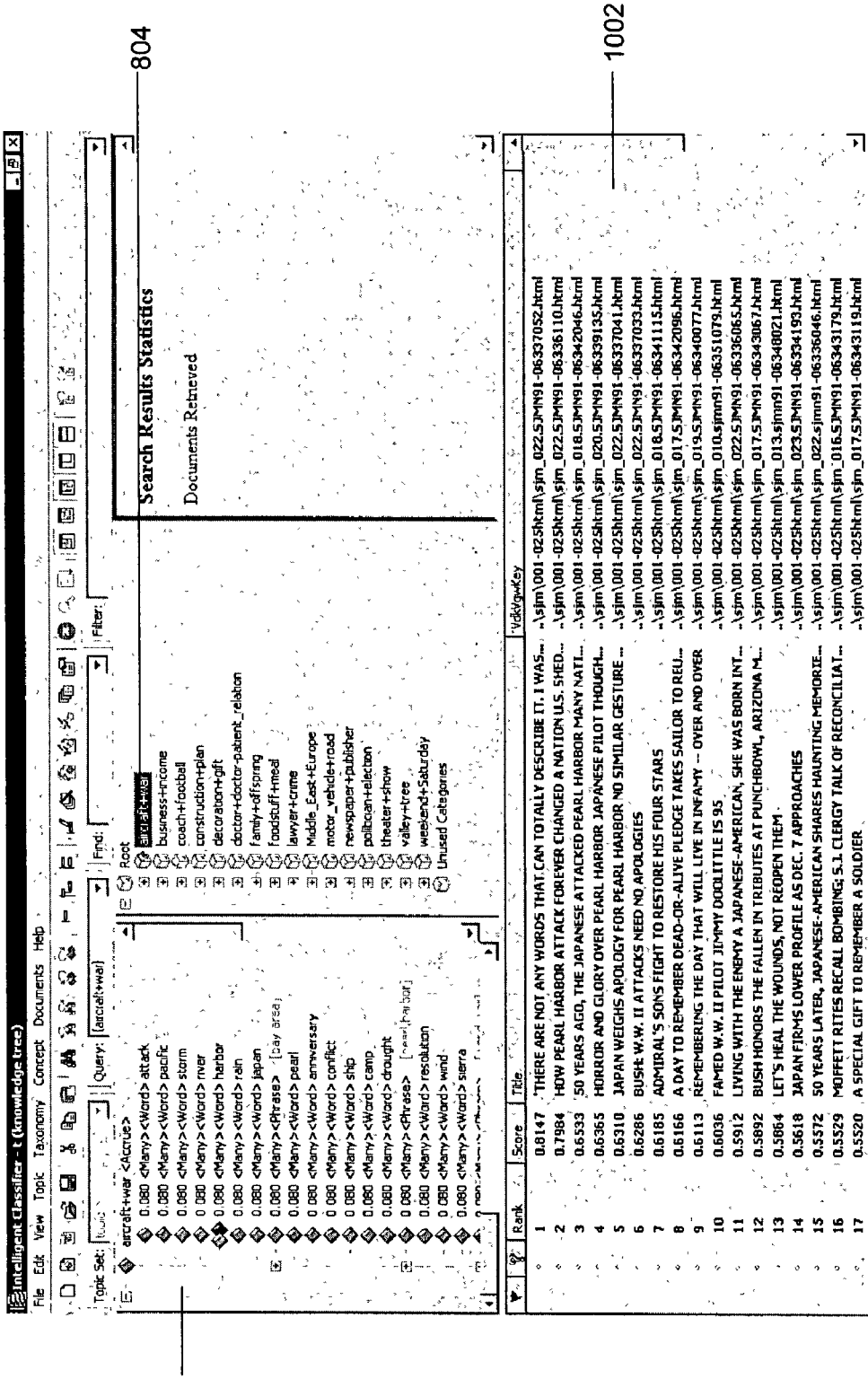
FIG. 10 is a screen shot of a Graphical User Interface that allows a user to retrieve relevant documents by automatically generating a query in accordance with an embodiment of the present invention.

The system also enables a user to form effective queries to retrieve relevant documents. An automatic query can be created for a concept in the concept hierarchy. FIG. 10 is a screen shot of a GUI that displays the concept hierarchy and allows a user to retrieve relevant documents by automatically generating a query in accordance with the present invention. The system automatically creates queries for concepts displayed in the concept hierarchy. A query associates a concept with the relevant documents from among the documents in the corpus. The system can automatically search the corpus of documents for a concept and retrieve documents relevant to the concept being searched. In FIG. 9 a query is created for concept "aircraft+war' 804. The signatures corresponding to the concept 'aircraft+war' are displayed in window 1004. The documents are searched based on the signatures associated with the concept. Documents wherein the associated signatures occur are retrieved. The documents are then arranged in descending order of relevance based on the weights assigned to each of the signatures occurring in the documents. The retrieved documents are displayed in window 1002.

The weight of each of the signatures that constitute a concept 'C' may be computed based on the occurrence frequency of the signature in the corpus of documents.

For a concept $C=\{s_1, \ldots, s_n\}$, the query terms in the associated query are the signatures $s_1 \ldots s_n$, which make up the concept. The weight of each query term in the query is computed based on its occurrence frequency in the corpus of documents.

According to an embodiment the weight can be computed as:

$$w(s_i) \min W + (\max W - \min W) \frac{f(s_i) - \min F}{\max F - \min F}$$

where, $w(s_i)$ is the weight of the query term $s_i$ and

[minW, maxW] is a pre-determined range for the weights of the query terms in the query, $$f(s_i) = \sum_j f_j(s_i)$$

$$\max F = \max\{f(s_i) | s_i \in C\}$$

$$\min F = \min\{f(s_i) | s_i \in C\}$$

The range [minW, maxW] can be chosen as [0,1]. The preferred embodiment adjusts it so that the weights of signatures in a long query are smaller:

$$\min W = k_1 e^{-\frac{|C|}{d}} + k_2$$

$$\max W = k_3 e^{-\frac{|C|}{d}} + k_4$$

For very long queries, the range of weights is [k2, k4]. For very short queries, the range of weights is [k1+k2, k3+k4]. Examples values for these parameters are k1=0.6, k2=0.05, k3=0.8, k4=0.1, d=30.

The system also provides for manual editing of a concept hierarchy. A user can rename the label of a concept, add/delete a concept, move a concept around in the concept hierarchy and add/delete signatures to a concept.

Figure 11:
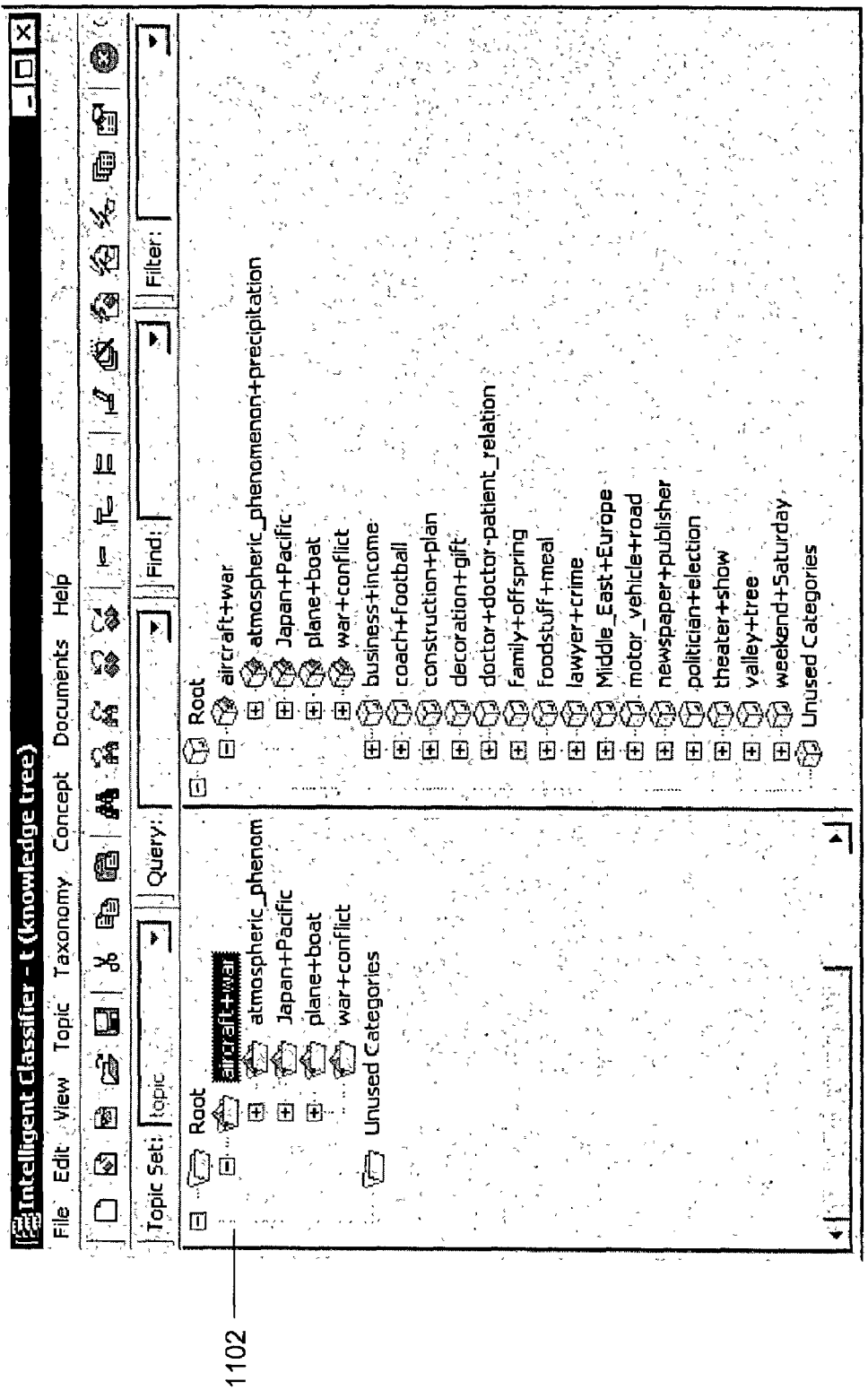
FIG. 11 is a screen shot of a Graphical User Interface that allows a user to create Document Taxonomy from a concept hierarchy generated automatically in accordance with an embodiment of the present invention.

FIG. 11 is a screen shot of a GUI that allows a user to create a Document Taxonomy from the concept hierarchy generated automatically in accordance with the present invention. A user can derive different categories of the Taxonomy from various parts of the concept hierarchy. The categories in the Document Taxonomy can derive their name from the labels assigned to the concepts. In FIG. 11, the Taxonomy is created in window 1102 wherein the category 'aircraft+war' is derived from the corresponding concept in the concept hierarchy. A query may be automatically generated for each node in the concept hierarchy or any part of the hierarchy selected by the user. The query associates relevant documents with the concept for which the query is created. The query thus allows a user to efficiently retrieve the requisite documents. Document taxonomy or a category in the document taxonomy may then be automatically derived from the concept hierarchy. The category of the document taxonomy may be automatically populated with documents retrieved from the query generated for the concepts. Further, the Taxonomy may be manually populated with documents from among those retrieved in response to a query generated. A category in a document taxonomy derived from the concept hierarchy will inherit the structure of the (selected part of) concept hierarchy, and each node in the taxonomy will inherit the label and the associated query from the corresponding concept in the concept hierarchy.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A computer-implemented method for automatically discovering a hierarchy of concepts from a corpus of documents, the concept hierarchy arranges concepts into multiple levels of abstraction, the method comprising:
   a. extracting signatures from the corpus of documents, wherein a signature comprises a noun or a noun phrase;
   b. identifying similarity between the signatures using a refined distribution, wherein the refined distribution is obtained by computing and iteratively refining similarity measures between the signatures;
   c. hierarchically clustering related signatures to generate concepts, wherein a concept is a cluster of related nouns and noun phrases;
   d. hierarchically arranging the concepts to obtain a concept hierarchy;
   e. labeling the concepts arranged in the concept hierarchy; and
   f. creating an interface for the concept hierarchy.

2. The method as recited in claim 1, wherein the step of extracting the signatures comprises:
   a. parsing the documents in the corpus using punctuation and capitalization information for obtaining the signatures;
   b. extracting the signatures representing the probability distribution of the signatures in the corpus;
   c. indexing the extracted signatures.

3. The method as recited in claim 1, wherein the step of identifying similarity between the signatures comprises:
   a. representing the signatures using distribution of the signatures in the corpus of documents;
   b. computing similarity measure between the signatures;
   c. refining distribution of the signatures in the corpus of documents;
   d. re-computing similarity measure between the signatures based on the refined distribution; and
   e. identifying related signatures using the re-computed similarity measure.

4. The method as recited in claim 3, wherein the step of computing similarity measure uses a modified Kullback-Leibner distance.

5. The method as recited in claim 3, wherein the step of computing similarity measure uses a mutual-information statistic.

6. The method as recited in claim 3, wherein the step of refining distribution of the signatures comprises:
   a. refining co-occurrence frequency distribution of the signatures in the corpus of documents; and
   b. disambiguating the signatures with a high occurrence frequency to account for the possibility of multiple senses for a signature.

7. The method as recited in claim 6, wherein the step of refining the co-occurrence frequency comprises:
   a. computing a smoothing parameter using the conditional probability of pairs of the signatures; and
   b. adding, at every iteration, the smoothing parameter to co-occurrence frequency of all the pairs of the signatures.

8. The method as recited in claim 6, wherein the step of disambiguating the signatures comprises:
   a. choosing ambiguous signatures;
   b. computing distinct senses for chosen signatures;
   c. representing a sense as the frequency distribution of it's constituent signatures;
   d. decomposing the frequency distribution of a disambiguated signature according to the number of senses computed corresponding to the disambiguated signature;
   e. adding the decomposed frequency distribution to the senses computed;
   f. adjusting frequency distribution of the signatures constituting a given sense;
   g. re-computing sense for a pair of signatures based on the adjusted frequency distribution; and
   h. recursively repeating steps f and g for a predefined number of iterations.

9. The method as recited in claim 1, wherein the step of hierarchically clustering comprises:
   a. measuring connectivity between the signatures based on the similarity measure between the signatures;
   b. clustering the signatures with highest connectivity, a cluster of the signatures representing a concept;
   c. measuring connectivity between at least two individual clusters of signatures;
   d. measuring compactness of the individual cluster of signatures;
   e. merging at least two individual clusters of signatures based on their connectivity; the merged clusters forming a parent cluster; and
   f. recursively repeating steps c, d and e till the number of merged clusters reaches a predefined number.

10. The method as recited in claim 1, wherein the step of hierarchically clustering uses a binary graph-partitioning algorithm for clustering.

11. The method as recited in claim 1, wherein one or more of the steps is embodied in a hardware chip.

12. A system for automatically discovering a hierarchy of concepts from a corpus of documents, the concept hierarchy organizes concepts into multiple levels of abstraction, the system comprising:
   a. means for extracting signatures from the corpus of documents, wherein a signature comprises a noun or a noun phrase;
   b. means for identifying similarity between the signatures using a refined distribution, wherein the refined distribution is obtained by computing and iteratively refining similarity measures between the signatures;
   c. means for hierarchically clustering related signatures to generate concepts, wherein a concept is a cluster of related nouns and noun phrases;
   d. means for hierarchically arranging the concepts to obtain a concept hierarchy;
   e. means for labeling concepts arranged in the concept hierarchy; and
   f. means for creating an interface for the concept hierarchy.

13. The system as recited in claim 12, wherein the means for extracting the signatures comprises:
   a. means for parsing the documents in the corpus using punctuation and capitalization information for obtaining the signatures;
   b. means for extracting the signatures representing the probability distribution of signatures in the corpus; and
   c. means for indexing the extracted signatures.

14. The system as recited in claim 12, wherein the means for identifying similarity between the signatures comprises:
   a. means for representing the signatures using the distribution of signatures in the corpus of documents;
   b. means for computing similarity measure between the signatures;

c. means for refining distribution of the signatures in the corpus of documents;
d. means for re-computing similarity measure of the signatures based on the refined distribution; and
e. means for identifying related signatures using the re-computed measure of similarity.

15. The system as recited in claim 14, wherein the means for computing similarity uses a modified Kullback-Leibner distance.

16. The system as recited in claim 14, wherein the means for computing the similarity measure between the signatures uses mutual-information measure.

17. The system as recited in claim 14, wherein the means for refining distribution of the signatures comprises:
a. means for refining co-occurrence frequency distribution of the signatures in the corpus of documents; and
b. means for disambiguating the signatures with a high occurrence frequency to account for the possibility of multiple senses for a signature.

18. The system as recited in claim 17, wherein the means for refining co-occurrence frequency comprises:
a. means for computing a smoothing parameter using conditional probability of the pair of the signatures; and
b. means for adding, at every iteration, the smoothing parameter to the co-occurrence frequency of all the pairs of the signatures.

19. The system as recited in claim 17, wherein the means for disambiguating the signatures comprises:
a. means for choosing ambiguous signatures;
b. means for computing distinct senses for a signature;
c. means for representing a sense as the frequency distribution of it's constituent signatures;
d. means for decomposing the frequency distribution of disambiguated signature according to the number of senses computed corresponding to the disambiguated signature;
e. means for adding the decomposed frequency distribution to the senses computed;
f. means for adjusting frequency distribution of the signatures constituting a given sense;
g. means for re-computing sense for a pair of signatures based on the adjusted frequency distribution; and
h. means for recursively repeating steps f and g for a predefined number of iterations.

20. The system as recited in claim 12, wherein the means for hierarchically clustering comprises:
a. measuring connectivity between the signatures based on the similarity measure between the signatures;
b. clustering the signatures with highest connectivity, a cluster of the signatures representing a concept;
c. measuring connectivity between at least two individual clusters of signatures;
d. measuring compactness of the individual cluster of signatures;
e. merging at least two individual clusters of the signatures based on their connectivity; the merged clusters forming a parent cluster; and
f. recursively repeating steps c, d and e till the number of merged clusters reaches a predefined value.

21. The system as recited in claim 12, wherein the means for hierarchically clustering uses a binary graph-partitioning algorithm for clustering.

22. The system as recited in claim 12, wherein the means for creating an interface for the automatically generated concept hierarchy has a means for searching of concepts in the concept hierarchy.

23. The system as recited in claim 12, wherein the means for creating an interface for the automatically generated concept hierarchy has a means for editing the concept hierarchy.

24. The system as recited in claim 12, wherein the means for creating an interface for the automatically generated concept hierarchy has a means for automatically generating a query that allows a user to automatically retrieve documents related to a concept in the concept hierarchy.

25. The system as recited in claim 12, wherein the system is embodied in a computer program.

26. A computer-implemented method for automatically discovering a hierarchy of concepts from a corpus of documents, the concept hierarchy arranging concepts into multiple levels of abstraction, the method comprising:
a. extracting signatures from the corpus of documents, wherein a signature comprises a noun or a noun phrase;
b. identifying similarity between the signatures; wherein the step of identifying similarity between the signatures includes the steps of:
  i. representing the signatures using distribution of the signatures in the corpus of documents;
  ii. computing similarity measure between the signatures;
  iii. refining distribution of the signatures in the corpus of documents;
  iv. re-computing similarity measure between the signatures based on the refined distribution; and
  v. identifying related signatures using the re-computed similarity measure;
c. hierarchically clustering related signatures to generate concepts, wherein a concept is a cluster of related nouns and noun phrases;
d. hierarchically arranging the concepts to obtain a concept hierarchy;
e. labeling the concepts arranged in the concept hierarchy; and
f. creating an interface for the concept hierarchy.

27. The method as recited in claim 26, wherein the step of hierarchically clustering comprises:
a. grouping the signatures into one cluster;
b. recursively partitioning clusters to form sub-clusters;
c. terminating the partitioning when a predefined number of sub-clusters are formed;
d. iteratively merging the sub-clusters to form merged clusters depending on the compactness of the sub-clusters; and
e. terminating the merging when a predefined number of merged clusters are formed.

28. The method as recited in claim 26, wherein the step of computing similarity measure uses a modified Kullback-Leibner distance.

29. The method as recited in claim 26, wherein the step of computing similarity measure uses a mutual-information statistic.

30. The method as recited in claim 26, wherein the step of refining distribution of the signatures comprises:
a. refining co-occurrence frequency distribution of the signatures in the corpus of documents; and
b. disambiguating the signatures with a high occurrence frequency to account for the possibility of multiple senses for a signature.

31. The method as recited in claim 30, wherein the step of refining the co-occurrence frequency comprises:
a. computing a smoothing parameter using the conditional probability of pairs of the signatures; and b. adding, at every iteration, the smoothing parameter to co-occurrence frequency of all the pairs of the signatures.

32. The method as recited in claim 30, wherein the step of disambiguating the signatures comprises:
   a. choosing ambiguous signatures;
   b. computing distinct senses for chosen signatures;
   c. representing a sense as the frequency distribution of it's constituent signatures;
   d. decomposing the frequency distribution of a disambiguated signature according to the number of senses computed corresponding to the disambiguated signature;
   e. adding the decomposed frequency distribution to the senses computed;
   f. adjusting frequency distribution of the signatures constituting a given sense;
   g. re-computing sense for a pair of signatures based on the adjusted frequency distribution; and
   h. recursively repeating steps f and g for a predefined number of iterations.

33. A system for automatically discovering a hierarchy of concepts from a corpus of documents, the concept hierarchy arranging concepts into multiple levels of abstraction, the system comprising:
   a. means for extracting signatures from the corpus of documents, wherein a signature comprises a noun or a noun phrase;
   b. means for identifying similarity between the signatures; wherein the means for identifying similarity between the signatures includes:
      i. means for representing the signatures using distribution of the signatures in the corpus of documents;
      ii. means for computing similarity measure between the signatures;
      iii. means for refining distribution of the signatures in the corpus of documents;
      iv. means for re-computing similarity measure between the signatures based on the refined distribution; and
      v. means for identifying related signatures using the re-computed similarity measure;
   c. means for hierarchically clustering related signatures to generate concepts, wherein a concept is a cluster of related nouns and noun phrases;
   d. means for hierarchically arranging the concepts to obtain a concept hierarchy;
   e. means for labeling the concepts arranged in the concept hierarchy; and
   f. means for creating an interface for the concept hierarchy.

34. The system as recited in claim 33, wherein the means for hierarchically clustering comprises:
   a. a means for grouping the signatures into one cluster;
   b. a means for recursively partitioning clusters to form sub-clusters;
   c. a means for terminating the partitioning when a predefined number of sub-clusters are formed;
   d. a means for iteratively merging the sub-clusters to form merged clusters depending on the compactness of the sub-clusters; and
   e. a means for terminating the merging when a predefined number of merged clusters are formed.

35. The system as recited in claim 33, wherein the means for computing similarity uses a modified Kullback-Leibner distance.

36. The system as recited in claim 33, wherein the means for computing the similarity measure between the signatures uses mutual-information measure.

37. The system as recited in claim 33, wherein the means for refining distribution of the signatures comprises:
   a. means for refining co-occurrence frequency distribution of the signatures in the corpus of documents; and
   b. means for disambiguating the signatures with a high occurrence frequency to account for the possibility of multiple senses for a signature.

38. The system as recited in claim 37, wherein the means for refining co-occurrence frequency comprises:
   a. means for computing a smoothing parameter using conditional probability of the pair of the signatures; and
   b. means for adding, at every iteration, the smoothing parameter to the co-occurrence frequency of all the pairs of the signatures.

39. The system as recited in claim 37, wherein the means for disambiguating the signatures comprises:
   a. means for choosing ambiguous signatures;
   b. means for computing distinct senses for a signature;
   c. means for representing a sense as the frequency distribution of it's constituent signatures;
   d. means for decomposing the frequency distribution of disambiguated signature according to the number of senses computed corresponding to the disambiguated signature;
   e. means for adding the decomposed frequency distribution to the senses computed;
   f. means for adjusting frequency distribution of the signatures constituting a given sense;
   g. means for re-computing sense for a pair of signatures based on the adjusted frequency distribution; and
   h. means for recursively repeating steps f and g for a predefined number of iterations.

* * * * *